US012475702B2

(12) United States Patent
Sato et al.

(10) Patent No.: US 12,475,702 B2
(45) Date of Patent: Nov. 18, 2025

(54) INFORMATION PROCESSING SYSTEM, INFORMATION PROCESSING METHOD, AND INFORMATION PROCESSING APPARATUS

(71) Applicant: SONY GROUP CORPORATION, Tokyo (JP)

(72) Inventors: Naoyuki Sato, Tokyo (JP); Hiromasa Uchiyama, Tokyo (JP); Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 279 days.

(21) Appl. No.: 17/754,215

(22) PCT Filed: Sep. 18, 2020

(86) PCT No.: PCT/JP2020/035399
§ 371 (c)(1),
(2) Date: Mar. 28, 2022

(87) PCT Pub. No.: WO2021/065559
PCT Pub. Date: Apr. 8, 2021

(65) Prior Publication Data
US 2022/0327818 A1    Oct. 13, 2022

(30) Foreign Application Priority Data
Oct. 4, 2019   (JP) .................................. 2019-183473

(51) Int. Cl.
*G06V 10/98*     (2022.01)
*B60W 50/02*     (2012.01)
(Continued)

(52) U.S. Cl.
CPC ....... *G06V 10/993* (2022.01); *B60W 50/0205* (2013.01); *G01S 7/40* (2013.01); *G06Q 40/08* (2013.01); *G06V 20/56* (2022.01)

(58) Field of Classification Search
CPC ...... G06V 10/993; G06V 20/56; G06V 10/74; G06V 10/764; B60W 50/0205; G01S 7/40; G06Q 40/08; G08G 1/097; G08G 1/16
See application file for complete search history.

(56) References Cited

U.S. PATENT DOCUMENTS 9,646,428 B1 * 5/2017 Konrardy ............. G07C 5/0816
9,691,151 B1 * 6/2017 Anderson-Sprecher ....................
                                                    G06T 7/344
(Continued)

FOREIGN PATENT DOCUMENTS

CN      109643492 A     4/2019
EP       3410382 A1    12/2018
(Continued)

OTHER PUBLICATIONS

International Search Report and Written Opinion of PCT Application No. PCT/JP2020/035399, issued on Nov. 24, 2020, 09 pages of ISRWO.

(Continued)

*Primary Examiner* — Scott A Browne
*Assistant Examiner* — Shahira Baajour
(74) *Attorney, Agent, or Firm* — CHIP LAW GROUP

(57) ABSTRACT

Provided are an information processing system, an information processing method, and an information processing apparatus that are capable of diagnosing sensor degradation. A recognition result of a predetermined recognition target based on results of sensing performed by a plurality of sensors mounted in a vehicle is acquired, the acquired (Continued)

recognition result is compared with another recognition result different from the acquired recognition result so that a comparison result is output, and performance degradation of each sensor is evaluated on the basis of the comparison result.

17 Claims, 24 Drawing Sheets

(51) Int. Cl.
*G01S 7/40* (2006.01)
*G06Q 40/08* (2012.01)
*G06V 20/56* (2022.01)

(56) References Cited

U.S. PATENT DOCUMENTS

| | | | | |
|---|---|---|---|---|
| 10,410,291 | B1* | 9/2019 | Binion | G06Q 40/08 |
| 2013/0208121 | A1 | 8/2013 | Wu | |
| 2016/0282874 | A1* | 9/2016 | Kurata | G01S 17/931 |
| 2017/0023659 | A1 | 1/2017 | Bruemmer | |
| 2019/0049968 | A1* | 2/2019 | Dean | G05D 1/617 |
| 2020/0013242 | A1 | 1/2020 | Hamada | |
| 2020/0086871 | A1* | 3/2020 | Gotoda | G05D 1/0088 |

FOREIGN PATENT DOCUMENTS

| | | |
|---|---|---|
| EP | 3627179 A1 | 3/2020 |
| JP | 2000-321350 A | 11/2000 |
| JP | 2012-098117 A | 5/2012 |
| JP | 2014106854 A | 6/2014 |
| JP | 2019149054 A | 9/2019 |
| JP | 2019152894 A | 9/2019 |
| WO | 2018/061425 A1 | 4/2018 |
| WO | WO-2018186127 A1 | 10/2018 |
| WO | 2018/212346 A1 | 11/2018 |

OTHER PUBLICATIONS

Haomin Zhou "Intelligent sensing technology and system", First Edition, Beijing University of Aeronautics and Astronautics Press, Sep. 30, 2008, pp. 280-285.

* cited by examiner

INFORMATION PROCESSING SYSTEM, INFORMATION PROCESSING METHOD, AND INFORMATION PROCESSING APPARATUS

CROSS REFERENCE TO RELATED APPLICATIONS

This application is a U.S. National Phase of International Patent Application No. PCT/JP2020/035399 filed on Sep. 18, 2020, which claims priority benefit of Japanese Patent Application No. JP 2019-183473 filed in the Japan Patent Office on Oct. 4, 2019. Each of the above-referenced applications is hereby incorporated herein by reference in its entirety.

TECHNICAL FIELD

The present disclosure relates to an information processing system, an information processing method, and an information processing apparatus, and more particularly, to an information processing system, an information processing method, and an information processing apparatus that are designed to be capable of diagnosing degradation of a sensor required for self-driving.

BACKGROUND ART

Various technologies for realizing self-driving have been suggested. As self-driving is becoming more common, sensor information supplied from a camera, a LiDAR (Light Detection and Ranging, Laser Imaging Detection and Ranging), and the like plays a very important role in maintaining safety at the time of driving.

However, when the results of sensing performed by a plurality of sensors are integrated, and a recognition process or the like is performed, it becomes difficult to determine degradation of each individual sensor.

That is, even if one of the sensors has degraded, for example, the results of sensing performed by the sensors that have not degraded are preferentially used, because the results of sensing performed by the plurality of sensors are integrated. As a result, any significant drop does not occur in the recognition accuracy, and it is difficult for the user to determine degradation.

However, if an individual sensor has degraded, safe driving is greatly affected when the result of the sensing performed by the degraded sensor is important, even though there is no problem with the normal driving.

For example, in a case where an obstacle is recognized in an image captured by a camera, a three-dimensional point cloud sensed by a LiDAR, or the like during driving, if degradation of the LiDAR is overlooked, there is a possibility that safe traveling is affected in a situation where backlight or the like appears.

That is, when backlight appears, the accuracy of recognition of an obstacle in an image captured by the camera becomes lower, and therefore, the obstacle recognition result based on the result of sensing performed by the LiDAR is relied upon.

However, because an obstacle recognition process is performed using a sensing result that is not sufficiently accurate due to degradation of the LiDAR, various kinds of determination are performed on the basis of recognition results based on the result of sensing performed by the LiDAR, though the obstacle recognition accuracy has dropped. In such a case, there is a possibility that sufficient safety in driving cannot be maintained.

In view of this, a technology disclosed in Patent Document 1 is used for detecting the presence/absence of a breakdown of a sensor. When a breakdown is detected, the broken sensor is not used, so that the results of sensing performed by the sensor that cannot secure the sufficient accuracy mentioned above will not be used. Thus, it is possible to avoid affecting various kinds of determination (see Patent Document 1).

CITATION LIST

Patent Document

Patent Document 1: Japanese Patent Application Laid-Open No. 2000-321350

SUMMARY OF THE INVENTION

Problems to be Solved by the Invention

However, by the technology according to Patent Document 1, a breakdown of a sensor can be detected, but degradation cannot be detected. Therefore, in a case where a breakdown has not occurred yet but rather significant degradation has occurred, the degradation is not recognized as a breakdown. Therefore, there is a possibility that sufficient safety cannot be secured, because various kinds of processes are performed using significantly degraded sensing results.

The present disclosure is made in view of such circumstances, and more particularly, aims to enable sensor degradation diagnosis.

Solutions to Problems

An information processing system and an information processing apparatus according to one aspect of the present disclosure is an information processing system and an information processing apparatus that include: a recognition result acquisition unit that acquires a recognition result of a predetermined recognition target, on the basis of results of sensing performed by a plurality of sensors mounted in a vehicle; a comparison unit that compares the acquired recognition result with another recognition result different from the acquired recognition result, and outputs a comparison result; and a degradation evaluation unit that evaluates performance degradation of each of the sensors, on the basis of the comparison result output from the comparison unit.

An information processing method according to one aspect of the present disclosure is an information processing method that includes the steps of: acquiring a recognition result of a predetermined recognition target, on the basis of results of sensing performed by a plurality of sensors mounted in a vehicle; comparing the acquired recognition result with another recognition result different from the acquired recognition result, and outputting a comparison result; and evaluating performance degradation of each of the sensors, on the basis of the comparison result.

In one aspect of the present disclosure, a recognition result of a predetermined recognition target based on results of sensing performed by a plurality of sensors mounted in a vehicle is acquired, the acquired recognition result is compared with another recognition result different from the acquired recognition result so that a comparison result is output, and performance degradation of each of the sensors is evaluated on the basis of the comparison result.

MODES FOR CARRYING OUT THE INVENTION

Figure 1:
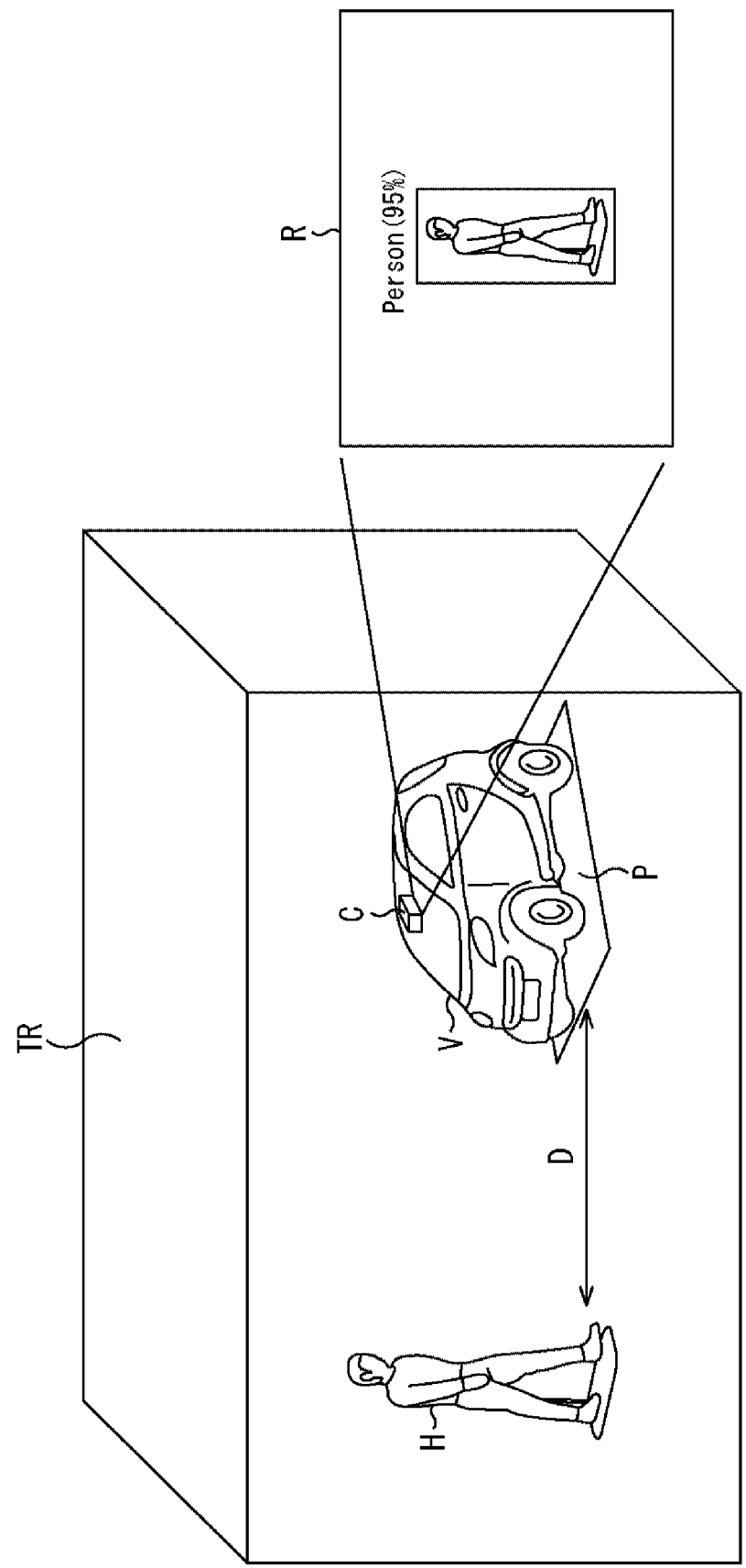
FIG. 1 is a diagram for explaining an outline of the present disclosure.

The following is a detailed description of preferred embodiments of the present disclosure, with reference to the accompanying drawings. Note that, in this specification and the drawings, components having substantially the same functional configurations are denoted by the same reference numerals, and explanation of them will not be repeated.

The following is a description of an embodiment for carrying out the present technology. Explanation will be made in the following order.

1. Outline of the present disclosure
2. First Embodiment
3. Modification of the first embodiment
4. Second Embodiment
5. Example applications
6. Examples in which processes are carried out by software <<1. Outline of the Present Disclosure>>

The present disclosure enables diagnosis of degradation of a plurality of sensors.

Referring first to FIG. 1, an outline of the present disclosure is described.

In a degradation diagnosis system of the present disclosure, a testing site TR for diagnosing degradation of a plurality of sensors is prepared, as shown in FIG. 1. In the testing site TR, a testing process is performed by various sensors of a vehicle V. Test results are accumulated, and degradation is diagnosed through comparison with the accumulated test results.

More specifically, the testing site TR is preferably located at an entrance or the like to various areas in which the possibility of contact with other persons is high, and safety is required, such as an entrance to a residential area, for example.

The vehicle V that is to perform self-driving enters the testing site TR located immediately before the entrance to the area requiring high safety, subjected to sensor degradation diagnosis testing, and suspends the self-driving when degradation is too large to secure enough safety, for example.

The testing site TR is designed as an indoor space so as to perform a testing process in a situation not to be affected by environments such as light and wind. Further, a stop position P at which the vehicle V to be tested is stopped is set in the testing site TR, and a recognition target H is provided at a position at a predetermined distance D from the stop position P.

Note that, in FIG. 1, a human-shaped doll is set as the recognition target H.

The vehicle V includes a camera C as a sensor, for example, and the camera C is the sensor to be tested.

When the vehicle V enters the testing site TR and stops at the stop position P, the testing is started. When the recognition target C is captured by the camera C, an object recognition process is performed on the basis of the captured image, and a result R is output.

The result R in FIG. 1 indicates that the recognition target H is detected at the position indicated by a frame in the image captured as an object recognition result by the camera C, the object name as a recognition result is "person", and the confidence of the recognition result is 95%. The confidence mentioned herein is the confidence of the object recognition result including both the position at which the recognition target H is detected and the object name, for example.

The positional relationship between the stop position P in the testing site TR and the recognition target H at a predetermined location at the distance D is common in the configuration, and the vehicle V accumulates information about results R obtained at various testing sites TR.

Figure 2:
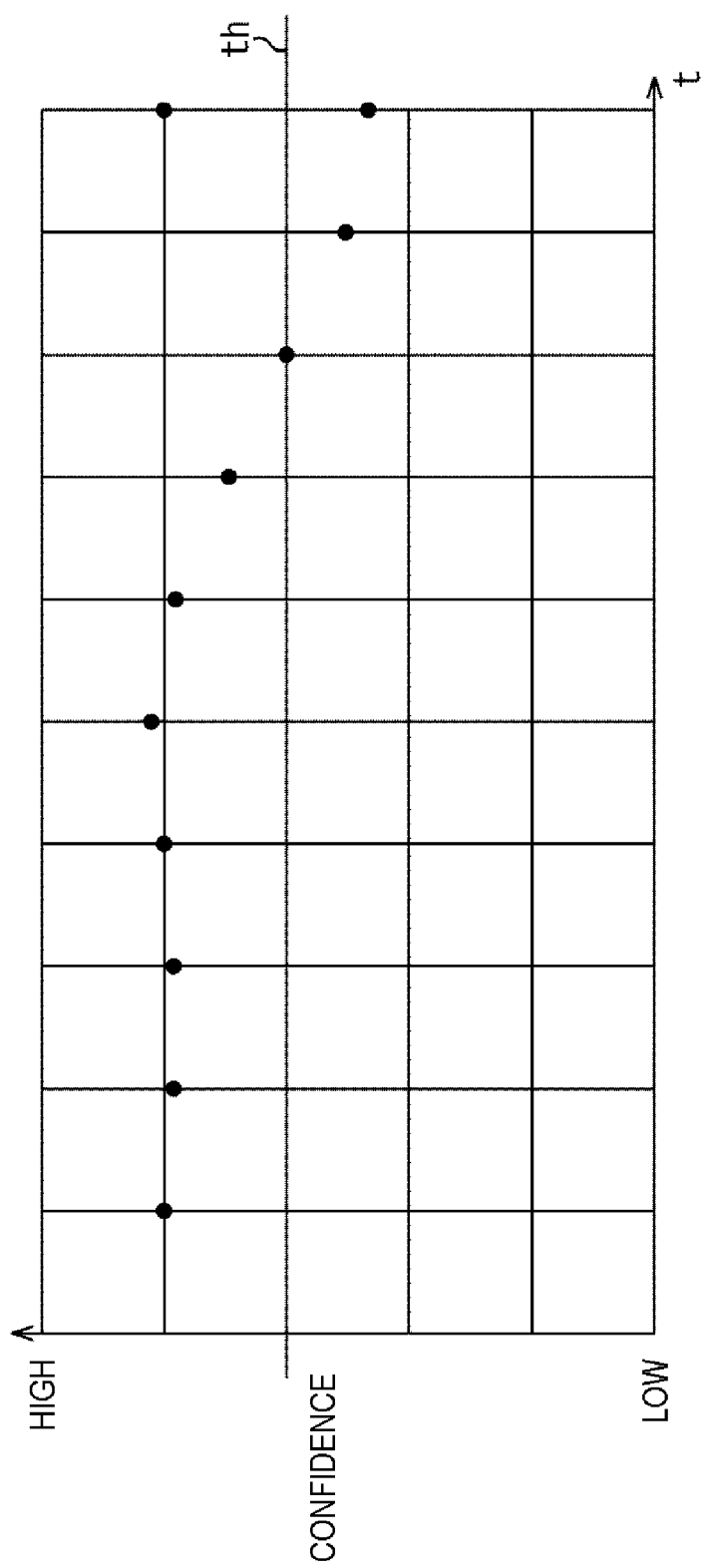
FIG. 2 is a diagram for explaining an outline of the present disclosure.

More specifically, the vehicle V accumulates information about the confidences included in the results R as time-series information as shown in FIG. 2, for example.

In FIG. 2, the ordinate axis indicates elapsed time t, and the abscissa axis indicates confidence.

As described above, in the testing site TR, the positional relationship between the vehicle V and the recognition target H is constant, and further, the environment is not affected by external factors such as light and wind. Accordingly, the confidence is substantially constant in theory.

However, degradation occurs in the camera C over time, and therefore, the confidence gradually drops.

In a case where the accumulated time-series result of the vehicle V is smaller than a predetermined threshold th, the influence of degradation is considered too significant to continue self-driving, from the recognition result of an object recognition process. Therefore, the vehicle V is not allowed to pass the test, and the self-driving of the vehicle V is suspended.

In the example described above, degradation caused by a decrease in confidence is determined. However, degradation is also determined in a manner similar to the above, if the object name as a recognition result is not "person", or the location indicated by a frame deviates from the correct location.

As testing is repeated in testing sites TR prepared in the same environments, information about the results R is sequentially accumulated, and sensor degradation is determined through comparison with the threshold.

As a result, it is possible to diagnose degradation that occurs before a sensor breaks down completely.

2. First Embodiment

Figure 3:
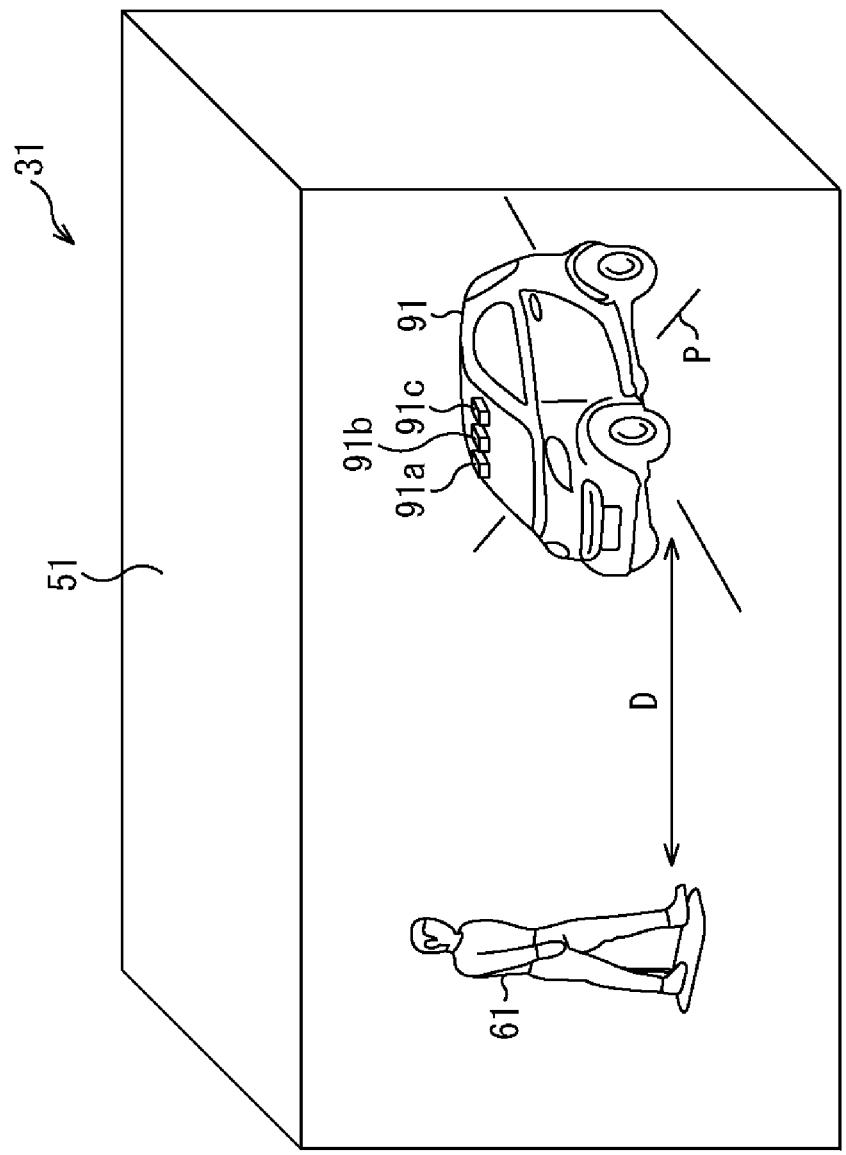
FIG. 3 is a diagram for explaining an example configuration of a degradation diagnosis system of the present disclosure.

Next, an example configuration of a first embodiment of the present disclosure is described, with reference to FIG. 3.

A degradation diagnosis system 31 of the present disclosure includes a testing site 51 and a vehicle 91 that is the vehicle to be tested.

The testing site 51 is located at an entrance or the like to various areas in which the possibility of contact with other persons is high, and safety is required, such as an entrance to a residential area for example. Also, the testing site 51 may be located at or near any position at which the vehicle 91 can be stopped, as long as the vehicle 91 can be subjected to degradation diagnosis testing. For example, the testing site 51 may be provided at a gas station, a parking lot, or the like.

The vehicle 91 includes a camera 91a, a LiDAR (Light Detection and Ranging, Laser Imaging Detection and Ranging) 91b, and a millimeter-wave radar 91c, for example, as the sensors for performing self-driving.

The vehicle 91 performs an object recognition process by integrating the respective results of sensing performed by the camera 91a, the LiDAR 91b, and the millimeter-wave radar 91c, or by selectively using each of the sensing results depending on conditions. On the basis of the recognition result, the vehicle 91 performs self-driving.

When entering an area requiring high safety, the vehicle 91 enters the testing site TR provided in the vicinity of the entrance, conducts degradation diagnosis testing on the sensors, and suspends the self-driving if the degradation is too large.

The testing site 51 is designed as an indoor space so as to perform a testing process in a situation not to be affected by environments such as light or wind. The stop position P at which the vehicle 91 to be tested is stopped is set, and a recognition target 61 is further provided at a location at the predetermined distance D from the stop position P.

Note that, in FIG. 3, a human-shaped doll is set as the recognition target 61.

After entering the testing site 51 and stopping at the stop position P, the vehicle 91 starts testing related to degradation diagnosis. After sensing the recognition target 61 with the camera 91a, the LiDAR 91b, and the millimeter-wave radar 91c, the vehicle 91 performs an object recognition process on the basis of each of the results of the sensing.

The vehicle 91 stores and accumulates the recognition results obtained by the object recognition process for each of the sensors, and evaluates degradation on the basis of information about the accumulated recognition results.

The degradation evaluation is conducted on the basis of the location, the object name, and the confidence included in the recognition result of each sensor.

More specifically, the location is evaluated on the basis of the amount of deviation of the location as a recognition result from the correct position.

Also, the object name is evaluated on the basis of whether or not the object name as a recognition result is the same as the correct object name, or is at least an object name similar to an allowable correct object name.

The confidence is calculated on the basis of the location and the object name, and is evaluated through comparison with a predetermined threshold indicating the allowable range.

The vehicle 91 can perform self-driving with any of the sensors, depending on the evaluation of degradation. However, in a case where the risk of an accident associated with self-driving is high, the insurance premium is recalculated in accordance with the risk, and the self-driving is continued only when approval of the recalculated insurance premium is obtained from the user or the owner of the vehicle 91.

In a case where self-driving is impossible according to the evaluation of degradation, on the other hand, the vehicle 91 suspends the self-driving, and calls for a substitute vehicle as necessary, for example.

Example Configuration of a Vehicle Control System

Figure 4:
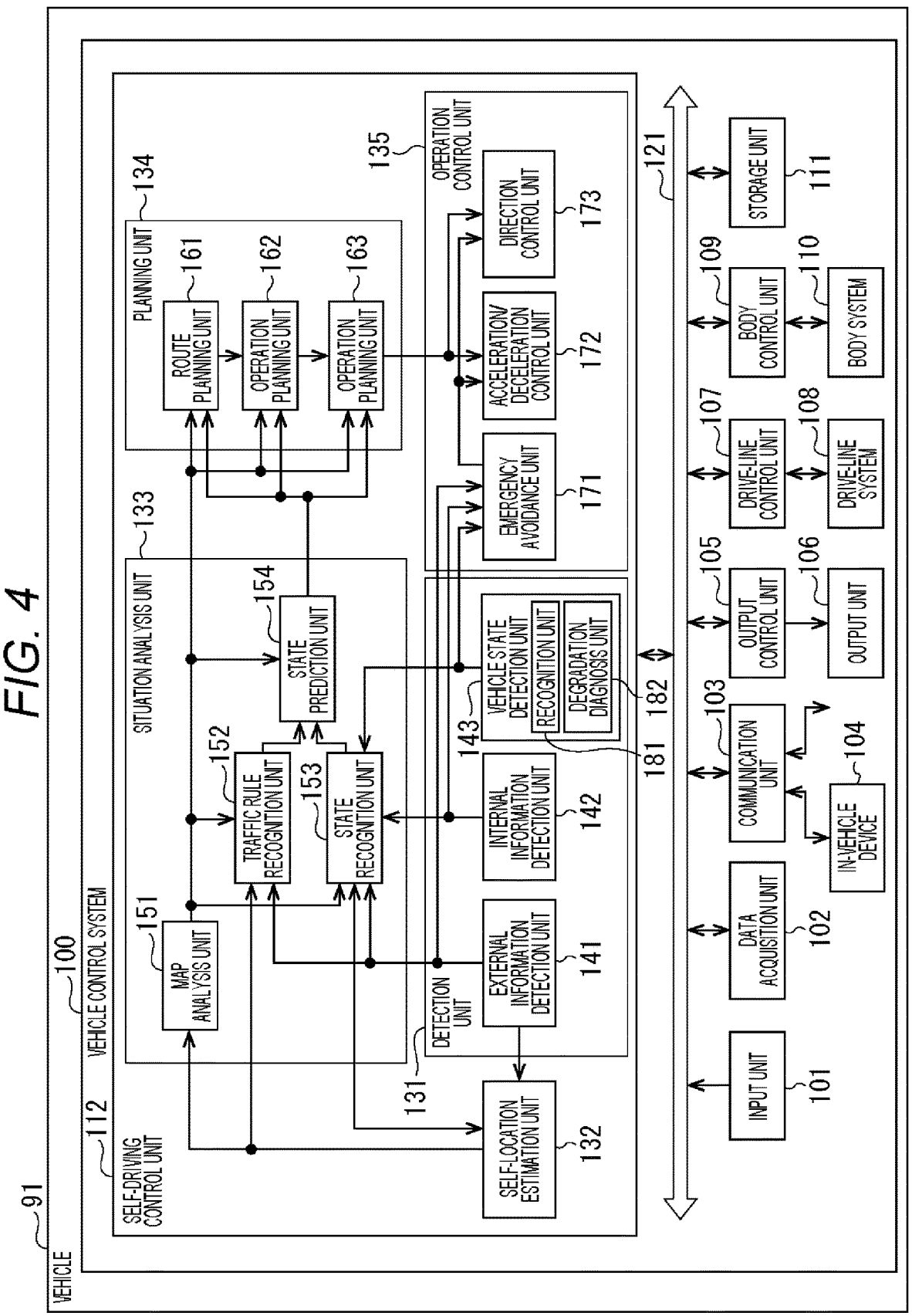
FIG. 4 is a diagram for explaining an example configuration of a vehicle control system of the present disclosure.

FIG. 4 is a block diagram showing a schematic example functional configuration of a vehicle control system 100 of the vehicle 91 that is an example of a mobile structure control system of a vehicle to which the present technology can be applied.

Further, in the description below, in a case where the vehicle in which the vehicle control system 100 is provided is distinguished from other vehicles, the vehicle will be referred to as the subject car or the subject vehicle. Note that the vehicle 91 in FIG. 4 corresponds to the vehicle C in FIG. 1.

The vehicle control system 100 includes an input unit 101, a data acquisition unit 102, a communication unit 103, an in-vehicle device 104, an output control unit 105, an output unit 106, a drive-line control unit 107, a drive-line system 108, a body control unit 109, a body system 110, a storage unit 111, and a self-driving control unit 112. The input unit 101, the data acquisition unit 102, the communication unit 103, the output control unit 105, the drive-line control unit 107, the body control unit 109, the storage unit 111, and the self-driving control unit 112 are connected to one another via a communication network 121. The communication network 121 is formed with an in-vehicle communication network, a bus, or the like compliant with an appropriate standard, such as a controller area network (CAN), a local interconnect network (LIN), a local area network (LAN), or FlexRay (registered trademark), for example. Note that the respective components of the vehicle control system 100 may be connected directly to one another in some cases without the communication network 121.

Note that, in the description below, in a case where the respective components of the vehicle control system 100 perform communication via the communication network 121, any description of the communication network 121 will be omitted. For example, in a case where the input unit 101 and the self-driving control unit 112 perform communication via the communication network 121, the communication will be described simply as communication performed between the input unit 101 and the self-driving control unit 112.

The input unit 101 includes devices that are used by a passenger to input various kinds of data, instructions, and the like. For example, the input unit 101 includes operation devices such as a touch panel, buttons, a microphone, switches, and a lever, and operation devices through which inputs can be made by a method other than a manual operation, such as by voice, gestures, or the like. Further, the input unit 101 may be a remote control device using infrared rays or other radio waves, or an external connection device such as a mobile device or a wearable device compatible with operation of the vehicle control system 100, for example. The input unit 101 generates an input signal on the basis of data, an instruction, or the like that is input by a passenger, and supplies the input signal to the respective components of the vehicle control system 100.

The data acquisition unit 102 includes various kinds of sensors and the like that acquire data to be used in processing to be performed by the vehicle control system 100, and supplies the acquired data to the respective components of the vehicle control system 100.

For example, the data acquisition unit 102 includes various kinds of sensors for detecting the state and the like of the subject vehicle. Specifically, the data acquisition unit 102 includes a gyroscope sensor, an acceleration sensor, an inertial measurement unit (IMU), and a sensor or the like for detecting an amount of operation of an accelerator pedal, an amount of operation of a brake pedal, a steering angle of a steering wheel, an engine speed, a motor rotation speed, a rotation speed of the wheels, or the like, for example.

The data acquisition unit 102 also includes various kinds of sensors for detecting information about the outside of the subject vehicle, for example. Specifically, the data acquisition unit 102 includes imaging devices such as a time-of-flight (ToF) camera, a stereo camera, a monocular camera, an infrared camera, and other kinds of cameras, for example. The data acquisition unit 102 also includes an environment sensor for detecting weather, climate, or the like, and an ambient information detection sensor for detecting objects around the subject vehicle, for example. The environment sensor is formed with a raindrop sensor, a fog sensor, a sunshine sensor, a snow sensor, or the like, for example. The ambient information detection sensor is formed with an ultrasonic sensor, a radar, or a light detection and ranging or laser imaging detection and ranging (LiDAR) device, a sonar, or the like, for example.

The data acquisition unit 102 further includes various kinds of sensors for detecting the current location of the subject vehicle, for example. Specifically, the data acquisition unit 102 includes a GNSS receiver that receives a GNSS signal from a global navigation satellite system (GNSS) satellite, or the like, for example.

The data acquisition unit 102 also includes various kinds of sensors for detecting information about the inside of the vehicle, for example. Specifically, the data acquisition unit 102 includes an imaging device that captures images of the driver, a biological sensor that detects biological information about the driver, a microphone that collects sound in the vehicle, and the like, for example. The biological sensor is disposed on a seating surface or the steering wheel or the like, for example, and detects biological information about the passenger sitting on the seat or the driver holding the steering wheel.

The communication unit 103 communicates with the in-vehicle device 104 and various devices outside the vehicle, such as servers and base stations. The communication unit 103 transmits data supplied from the respective components of the vehicle control system 100, and supplies received data to the respective components of the vehicle control system 100. Note that the communication protocol supported by the communication unit 103 is not limited to any particular one, and the communication unit 103 can also support a plurality of kinds of communication protocols.

For example, the communication unit 103 performs wireless communication with the in-vehicle device 104 through a wireless LAN, Bluetooth (registered trademark), near field communication (NFC), a wireless USB (WUSB), or the like. The communication unit 103 also performs wired communication with the in-vehicle device 104 through a universal serial bus (USB), a high-definition multimedia interface (HDMI), a mobile high-definition link (MHL), or the like via a connecting terminal (and a cable, if necessary) not shown in the drawing, for example.

The communication unit 103 further performs communication with a device (an application server or a control server, for example) existing in an external network (the Internet, a cloud network, or a company-specific network, for example) via a base station or an access point, for example. The communication unit 103 also performs communication with a terminal (a terminal of a pedestrian or a shop, or a machine type communication (MTC) terminal, for example) existing in the vicinity of the subject vehicle, using the peer-to-peer (P2P) technology, for example. The communication unit 103 further conducts V2X communication, such as vehicle-to-vehicle communication, vehicle-to-infrastructure communication, communication between the subject vehicle and home (vehicle-to-home), and vehicle-to-pedestrian communication, for example. The communication unit 103 also includes a beacon reception unit, to receive radio waves or electromagnetic waves transmitted from a wireless station or the like installed on a road, and acquire information about the current location, traffic congestion, closing of a road, a required time, or the like, for example.

The in-vehicle device 104 includes a mobile device or a wearable device possessed by a passenger, an information device that is carried into or attached to the subject vehicle, a navigation device that searches for a route to a desired destination, and the like, for example.

The output control unit 105 controls outputs of various kinds of information to a passenger of the subject vehicle or the outside of the vehicle. For example, the output control unit 105 generates an output signal including at least one piece of visual information (image data, for example) and audio information (audio data, for example), and supplies the output signal to the output unit 106, to control outputs of visual information and audio information from the output unit 106. Specifically, the output control unit 105 generates an overhead image, a panoramic image, or the like by combining image data captured by different imaging devices of the data acquisition unit 102, for example, and supplies an output signal including the generated image to the output unit 106. The output control unit 105 also generates audio data including a warning sound, a warning message, or the like for danger such as a collision, contact, or entry into a dangerous zone, for example, and supplies an output signal including the generated audio data to the output unit 106.

The output unit 106 includes devices capable of outputting visual information or audio information to a passenger of the subject vehicle or to the outside the vehicle. For example, the output unit 106 includes a display device, an instrument panel, an audio speaker, headphones, a wearable device such as a spectacle-like display to be worn by a passenger, a projector, a lamp, and the like. The display device included in the output unit 106 is not necessarily a device with a conventional display, but may be a device that displays visual information in the driver's field of view, such as a head-up display, a transmissive display, or a display having an augmented reality (AR) display function, for example.

The drive-line control unit 107 generates various kinds of control signals, and supplies the control signals to the drive-line system 108, to control the drive-line system 108. The drive-line control unit 107 also supplies control signals to the respective components other than the drive-line system 108 as necessary, and notifies the other components of a control state of the drive-line system 108 or the like.

The drive-line system 108 includes various kinds of devices related to the drive-line of the subject vehicle. For example, the drive-line system 108 includes a driving force generator for generating a driving force such as an internal combustion engine or a driving motor, a driving force transmission mechanism for transmitting the driving force to the wheels, a steering mechanism for adjusting the steering angle, a braking device that generates a braking force, an antilock brake system (ABS), an electronic stability control (ESC), an electric power steering device, and the like.

The body control unit 109 generates various kinds of control signals, and supplies the control signals to the body system 110, to control the body system 110. The body control unit 109 also supplies control signals to the respective components other than the body system 110 as necessary, and notifies the other components of a control state or the like of the body system 110.

The body system 110 includes various kinds of body devices that are mounted on the vehicle body. For example, the body system 110 includes a keyless entry system, a smart key system, a powered window device, powered seats, a steering wheel, an air conditioner, various lamps (such as headlamps, tail lamps, a brake lamp, a blinker, and a fog lamp for example), and the like.

The storage unit 111 includes a read only memory (ROM), a random access memory (RAM), a magnetic storage device such as a hard disc drive (HDD), a semiconductor storage device, an optical storage device, a magneto-optical storage device, and the like, for example. The storage unit 111 stores various kinds of programs, data, and the like to be used by the respective components of the vehicle control system 100. For example, the storage unit 111 stores map data such as a three-dimensional high-precision map such as a dynamic map, a global map that is less precise than a high-precision map but covers a wider area, and a local map that includes information about the surroundings of the subject vehicle.

The self-driving control unit 112 performs control related to self-driving such as autonomous running or drive assist. Specifically, the self-driving control unit 112 performs cooperative control to achieve the functions of an advanced driver assistance system (ADAS), including collision avoidance or shock mitigation of the subject vehicle, follow-up running based on the distance between vehicles, vehicle speed maintenance running, a collision warning for the subject vehicle, a lane deviation warning for the subject vehicle, or the like, for example. The self-driving control unit 112 also performs cooperative control to conduct self-driving or the like for autonomously traveling without depending on the operation by the driver, for example. The self-driving control unit 112 includes a detection unit 131, a self-location estimation unit 132, a situation analysis unit 133, a planning unit 134, and an operation control unit 135.

The detection unit 131 detects various kinds of information necessary for controlling self-driving. The detection unit 131 includes an external information detection unit 141, an internal information detection unit 142, and a vehicle state detection unit 143.

The external information detection unit 141 performs a process of detecting information about the outside of the subject vehicle, on the basis of data or signals from the respective components of the vehicle control system 100. For example, the external information detection unit 141 performs a process of detecting, recognizing, and tracking an object around the subject vehicle, and a process of detecting the distance to the object. Examples of objects to be detected include vehicles, people, obstacles, structures, roads, traffic lights, traffic signs, road signs, and the like. The external information detection unit 141 also performs a process of detecting the environment around the subject vehicle, for example. The ambient environments to be detected include weather, temperature, humidity, brightness, road surface conditions, and the like, for example. The external information detection unit 141 supplies data indicating the results of the detection processes to the self-location estimation unit 132, a map analysis unit 151, a traffic rule recognition unit 152, and a situation recognition unit 153 of the situation analysis unit 133, an emergency avoidance unit 171 of the operation control unit 135, and the like.

The internal information detection unit 142 performs a process of detecting information about the inside of the vehicle, on the basis of data or signals from the respective components of the vehicle control system 100. For example, the internal information detection unit 142 performs a process of authenticating and recognizing the driver, a process of detecting a state of the driver, a process of detecting a passenger, a process of detecting the internal environment of the vehicle, and the like. The states of the driver to be detected include physical conditions, an arousal level, a concentration level, a fatigue level, a gaze direction, and the like, for example. The internal environments to be detected include temperature, humidity, brightness, odor, and the like, for example. The internal information detection unit 142 supplies data indicating the results of the detection processes to the situation recognition unit 153 of the situation analysis unit 133, the emergency avoidance unit 171 of the operation control unit 135, and the like.

The vehicle state detection unit 143 performs a process of detecting a state of the subject vehicle, on the basis of data or signals from the respective components of the vehicle control system 100. The states of the subject vehicle to be detected include a velocity, an acceleration, a steering angle, presence/absence and details of an abnormality, a driving operation state, powered seat positions and tilts, a door lock state, states of the other in-vehicle devices, and the like, for example. The vehicle state detection unit 143 supplies data indicating the results of the detection processes to the situation recognition unit 153 of the situation analysis unit 133, the emergency avoidance unit 171 of the operation control unit 135, and the like.

Further, the vehicle state detection unit 143 includes a recognition unit 181 and a degradation diagnosis unit 182.

The recognition unit 181 performs an object recognition process based on each piece of data or each signal from various kinds of sensors in the data acquisition unit 102 of the vehicle control system 100, and outputs a recognition result to the degradation diagnosis unit 182.

The degradation diagnosis unit 182 makes diagnosis of degradation of the sensors, on the basis of the recognition result and the confidence of the recognition unit 181, and evaluates the degradation.

More specifically, the recognition unit 181 performs an object recognition process on the basis of data or signals that are acquired by conducting testing in the testing site 51 and are supplied from various sensors in the data acquisition unit 102 of the vehicle control system 100, and outputs a recognition result to the degradation diagnosis unit 182.

The degradation diagnosis unit 182 accumulates recognition results supplied from the recognition unit 181 in chronological order, and evaluates degradation for each sensor by comparing the accumulated results with the current recognition result.

At this point of time, the degradation diagnosis unit 182 stops the self-driving, depending on the evaluation of degradation in the degradation diagnosis.

Also, self-driving can be performed depending on the evaluation of degradation in the degradation diagnosis. However, when the risk of accident or the like increases while self-driving is possible, the degradation diagnosis unit 182 recalculates a new automobile insurance premium according to the risk, and requests the user or the owner of the vehicle 91 to approve the renewal of the insurance contract with the new insurance premium. When the approval is obtained, self-driving can be resumed.

Note that the configurations of the recognition unit 181 and the degradation diagnosis unit 182 will be described later in detail with reference to FIG. 5.

The self-location estimation unit 132 performs a process of estimating the location, the posture, and the like of the subject vehicle, on the basis of data or signals from the respective components of the vehicle control system 100, such as the external information detection unit 141 and the situation recognition unit 153 of the situation analysis unit 133. The self-location estimation unit 132 also generates a local map (hereinafter referred to as the self-location estimation map) to be used for self-location estimation, as necessary. The self-location estimation map is a highly accurate map using a technique such as simultaneous localization and mapping (SLAM), for example. The self-location estimation unit 132 supplies data indicating the result of the estimation process to the map analysis unit 151, the traffic rule recognition unit 152, the situation recognition unit 153, and the like of the situation analysis unit 133. The self-location estimation unit 132 also stores the self-location estimation map into the storage unit 111.

The situation analysis unit 133 performs an analysis process on the situation of the subject vehicle and the surroundings. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 while using data or signals from the respective components of the vehicle control system 100, such as the self-location estimation unit 132 and the external information detection unit 141, as necessary, and constructs a map that includes the information necessary for a self-driving process. The map analysis unit 151 supplies the constructed map to the traffic rule recognition unit 152, the situation recognition unit 153, the situation prediction unit 154, and a route planning unit 161, an action planning unit 162, an operation planning unit 163, and the like of the planning unit 134.

The traffic rule recognition unit 152 performs a process of recognizing the traffic rules in the surroundings of the subject vehicle, on the basis of data or signals from the respective components of the vehicle control system 100, such as the self-location estimation unit 132, the external information detection unit 141, and the map analysis unit 151. Through this recognition process, the locations and the states of signals around the subject vehicle, the contents of traffic restrictions around the subject vehicle, the lanes that allow running, and the like are recognized, for example. The traffic rule recognition unit 152 supplies data indicating the results of the recognition process to the situation prediction unit 154 and the like.

The situation recognition unit 153 performs a process of recognizing a situation relating to the subject vehicle, on the basis of data or signals from the respective components of the vehicle control system 100, such as the self-location estimation unit 132, the external information detection unit 141, the internal information detection unit 142, the vehicle state detection unit 143, and the map analysis unit 151. For example, the situation recognition unit 153 performs a process of recognizing the situation of the subject vehicle, the situation of the surroundings of the subject vehicle, the situation of the driver of the subject vehicle, and the like. The situation recognition unit 153 also generates a local map (hereinafter referred to as the situation recognition map) to be used for recognition of the situation around the subject vehicle, as necessary. The situation recognition map is an occupancy grid map, for example.

Situations of the subject vehicle to be recognized include a location, a posture, movement (such as a speed, an acceleration, and a moving direction, for example) of the subject vehicle, presence/absence and the contents of an abnormality, and the like, for example. Situations of the surroundings of the subject vehicle to be recognized include the types and the locations of stationary objects in the surroundings, the types, the locations, and the movement (such as speeds, accelerations, and moving directions, for example) of moving objects in the surroundings, the configuration of the roads and the states of the road surfaces in the surroundings, the weather, the temperature, the humidity, and brightness of the surroundings, and the like, for example. States of the driver to be recognized includes physical conditions, an arousal level, a concentration level, a fatigue level, line-of-sight movement, a driving operation, and the like, for example.

The situation recognition unit 153 supplies data (including the situation recognition map, as necessary) indicating the results of the recognition process to the self-location estimation unit 132, the situation prediction unit 154, and the like. The situation recognition unit 153 also stores the situation recognition map into the storage unit 111.

The situation prediction unit 154 performs a process of predicting a situation related to the subject vehicle, on the basis of data or signals from the respective components of the vehicle control system 100, such as the map analysis unit 151, the traffic rule recognition unit 152, and the situation recognition unit 153. For example, the situation prediction unit 154 performs a process of predicting a situation of the subject vehicle, a situation of the surroundings of the subject vehicle, a situation of the driver, and the like.

Situations of the subject vehicle to be predicted include a behavior of the subject vehicle, an occurrence of an abnormality, a distance that can be covered, and the like, for example. Situations of the surroundings of the subject vehicle to be predicted include behaviors of moving objects in the surroundings of the subject vehicle, changes in signal states, changes in the environments such as weather, and the like, for example. Situations of the driver to be predicted include behaviors, physical conditions, and the like of the driver, for example.

The situation prediction unit 154 supplies data indicating the results of the prediction process, together with the data from the traffic rule recognition unit 152 and the situation recognition unit 153, to the route planning unit 161, the action planning unit 162, the operation planning unit 163, and the like of the planning unit 134.

The route planning unit 161 plans a route to a destination, on the basis of data or signals from the respective components of the vehicle control system 100, such as the map analysis unit 151 and the situation prediction unit 154. For example, the route planning unit 161 sets a route from the current location to a designated destination, on the basis of the global map. The route planning unit 161 also changes routes as appropriate, on the basis of situations such as a traffic jam, an accident, a traffic restriction, and a construction, the physical conditions of the driver, and the like, for example. The route planning unit 161 supplies data indicating the planned route to the action planning unit 162 and the like.

On the basis of data or signals from the respective components of the vehicle control system 100, such as the map analysis unit 151 and the situation prediction unit 154, the action planning unit 162 plans an action of the subject vehicle to safely travel the route planned by the route planning unit 161 within a planned period of time. For example, the action planning unit 162 plans a start, a stop, a traveling direction (such as a forward direction, a backward direction, a left turn, a right turn, or a change of direction, for example), a running lane, a running velocity, passing, or the like. The action planning unit 162 supplies data indicating the planned action of the subject vehicle to the operation planning unit 163 and the like.

On the basis of data or signals from the respective components of the vehicle control system 100, such as the map analysis unit 151 and the situation prediction unit 154, the operation planning unit 163 plans an operation of the subject vehicle to realize the action planned by the action planning unit 162. For example, the operation planning unit 163 plans acceleration, deceleration, a traveling track, or the like. The operation planning unit 163 supplies data indicating the planned operation of the subject vehicle to an acceleration/deceleration control unit 172, a direction control unit 173, and the like of the operation control unit 135.

The operation control unit 135 controls operation of the subject vehicle. The operation control unit 135 includes the emergency avoidance unit 171, the acceleration/deceleration control unit 172, and the direction control unit 173.

The emergency avoidance unit 171 performs a process of detecting an emergency situation such as a collision, contact, entry into a danger zone, an abnormality of the driver, an abnormality of the vehicle, or the like, on the basis of results of detection performed by the external information detection unit 141, the internal information detection unit 142, and the vehicle state detection unit 143. In a case where an occurrence of an emergency situation is detected, the emergency avoidance unit 171 plans an operation of the subject vehicle to avoid an emergency situation such as a sudden stop or a sudden turn. The emergency avoidance unit 171 supplies data indicating the planned operation of the subject vehicle to the acceleration/deceleration control unit 172, the direction control unit 173, and the like.

The acceleration/deceleration control unit 172 performs acceleration/deceleration control for realizing an operation of the subject vehicle planned by the operation planning unit 163 or the emergency avoidance unit 171. For example, the acceleration/deceleration control unit 172 calculates a control target value for a driving force generator or a braking device to perform planned acceleration, deceleration, or a sudden stop, and supplies a control command indicating the calculated control target value to the drive-line control unit 107.

The direction control unit 173 performs direction control for realizing an operation of the subject vehicle planned by the operation planning unit 163 or the emergency avoidance unit 171. For example, the direction control unit 173 calculates a control target value for the steering mechanism to travel on a traveling track or perform a sudden turn as planned by the operation planning unit 163 or the emergency avoidance unit 171, and supplies a control command indicating the calculated control target value to the drive-line control unit 107.

First Example Configuration of the Degradation Diagnosis Unit

Next, a first example configuration of the recognition unit 181 and the degradation diagnosis unit 182 is described with reference to FIG. 5.

The recognition unit 181 performs an object recognition process on the basis of data or signals supplied from various sensors of the data acquisition unit 102, and outputs a recognition result from each sensor to a recognition result acquisition unit 221.

More specifically, the recognition unit 181 includes a camera recognition unit 241, a LiDAR recognition unit 242, a millimeter-wave radar recognition unit 243, an other-sensor recognition unit 244, and a location information acquisition unit 245.

The camera recognition unit 241 performs an object recognition process on the basis of an image captured by a camera including an image sensor such as a complementary metal oxide semiconductor (CMOS) or a charge coupled device (CCD) among the sensors of the data acquisition unit 102, and outputs a recognition result including the location of the object and the object name to the recognition result acquisition unit 221.

The LiDAR recognition unit 242 performs an object recognition process on the basis of a point cloud that is a result of sensing performed by a LiDAR among the sensors of the data acquisition unit 102, and outputs a recognition result including the location of the object and the object name to the recognition result acquisition unit 221.

The millimeter-wave radar recognition unit 243 performs an object recognition process on the basis of a result of sensing performed by a millimeter-wave radar among the sensors of the data acquisition unit 102, and outputs a recognition result including the location of the object and the object name to the recognition result acquisition unit 221.

The other-sensor recognition unit 244 performs an object recognition process on the basis of a result of sensing performed by a sensor other than the camera, the LiDAR, and the millimeter-wave radar described above, and outputs a recognition result including the location of the object and the object name to the recognition result acquisition unit 221. Note that, as for specific examples of other sensors, refer to the explanation of the data acquisition unit 102 described above with reference to FIG. 4.

The location information acquisition unit 245 acquires a global location information acquired from the GPS of the data acquisition unit 102, and supplies the location information, together with the time information about the timing of the acquisition, to the recognition result acquisition unit 221.

The degradation diagnosis unit 182 includes the recognition result acquisition unit 221, a confidence calculation unit 222, a comparison unit 223, a degradation determination unit 224, an insurance premium determination unit 225, and a UI display control unit 226.

The recognition result acquisition unit 221 acquires the recognition results of various sensors supplied from the camera recognition unit 241, the LiDAR recognition unit 242, the millimeter-wave radar recognition unit 243, and the other-sensor recognition unit 244 of the recognition unit 181, and the location information and the time information supplied from the location information acquisition unit 245, associates these pieces of information with one another, stores them into the storage unit 111, and supplies them to the confidence calculation unit 222.

The confidence calculation unit 222 calculates the confidence of each of the recognition results on the basis of the recognition results of various sensors that have been supplied from the camera recognition unit 241, the LiDAR recognition unit 242, the millimeter-wave radar recognition unit 243, and the other-sensor recognition unit 244 of the recognition unit 181 and are supplied from the recognition result acquisition unit 221, associates these pieces of information with one another, stores them into the storage unit 111, and supplies them to the comparison unit 223.

The comparison unit 223 compares the confidence of the current recognition result supplied from the confidence calculation unit 222 with the past confidences stored in the storage unit 111.

The comparison unit 223 also compares the location that is the recognition result, the location that is the correct answer for the object name, and the object name (an object name similar to the correct answer).

The comparison unit 223 then supplies, to the degradation determination unit 224, the result of comparison among the location that is the recognition result, the location that is the correct answer for the object name, and the object name (an object name similar to the correct answer), as well as the result of comparison between the confidence of the current recognition result supplied from the confidence calculation unit 222 and the past confidences stored in the storage unit 111.

The degradation determination unit 224 evaluates degradation of each sensor, on the basis of the location and the object name in the recognition results, and the confidence comparison results.

More specifically, the degradation determination unit 224 evaluates the degradation of each sensor, on the basis of the result of comparison as to whether or not the location information deviates from the correct location by at least a predetermined value indicating the allowable range.

The degradation determination unit 224 also evaluates degradation of each sensor, on the basis of the result of comparison as to whether or not the object name is the correct object name, or whether or not the object name is an object name similar to the correct object name.

Further, the degradation determination unit 224 evaluates degradation, on the basis of the result of comparison performed by the comparison unit 223 between the confidence of the current recognition result supplied from the confidence calculation unit 222 and the past confidences stored in the storage unit 111.

The degradation determination unit 224 evaluates degradation of each sensor, from the results of confidence comparison, the respective results of comparison as to the location information that is a recognition result and the object name, and outputs the evaluation results as degradation evaluation to the insurance premium determination unit 225, the UI display control unit 226, and the situation recognition unit 153.

In a case where degradation is observed but self-driving is possible on the basis of the degradation evaluation acquired from the degradation determination unit 224, the insurance premium determination unit 225 recalculates the insurance premium corresponding to the risk according to the degree of degradation, and outputs the insurance premium to the UI display control unit 226.

On the basis of information about the recalculated insurance premium supplied from the insurance premium determination unit 225, the UI display control unit 226 performs control to present an image for requesting the user or the owner of the vehicle 91 to approve the update of the insurance premium according to the risk associated with the degradation, and inquires of the user or the owner whether or not to approve the change to the insurance premium.

In a case where the change to the recalculated insurance premium is approved, the insurance premium determination unit 225 then controls the communication unit 103 to access a server managed and operated by the insurance company, requests a renewal of the contract with the new insurance premium, and notifies the degradation determination unit 224 to that effect when the request is accepted.

When it is confirmed that a contract with the new insurance premium has been made, the degradation determination unit 224 determines self-driving to be possible, and notifies the UI display control unit 226 and the situation recognition unit 153 to that effect.

Note that, when a notification indicating that the change to the recalculated insurance premium is unacceptable is received from the user or the owner of the vehicle 91, the insurance premium determination unit 225 notifies the UI display control unit 226 and the situation recognition unit 153 of suspension of the self-driving.

On the basis of the degradation evaluation, the UI display control unit 226 causes a display or the like of the output unit 106 to display various kinds of information, to notify the user or the owner whether or not continuation of the self-driving is possible.

Further, when there is a request for updating the insurance premium as described above, the UI display control unit 226 performs control to present an image for requesting update of the insurance premium to the user or the owner of the vehicle 91, receives a response, and returns the response to the insurance premium determination unit 225.

The situation recognition unit 153 receives the notification regarding permission/prohibition of self-driving based on the degradation evaluation from the degradation determination unit 224 and the update of the insurance premium, recognizes continuation or suspension of the self-driving of the vehicle 91 according to the notification, and continues or suspends the self-driving of the vehicle 91.

Examples of Recognition Results of an Object Recognition Process Based on an Image Example 1

Next, examples of recognition results of an object recognition process based on an image are described with reference to FIGS. 6 and 7.

Figure 6:
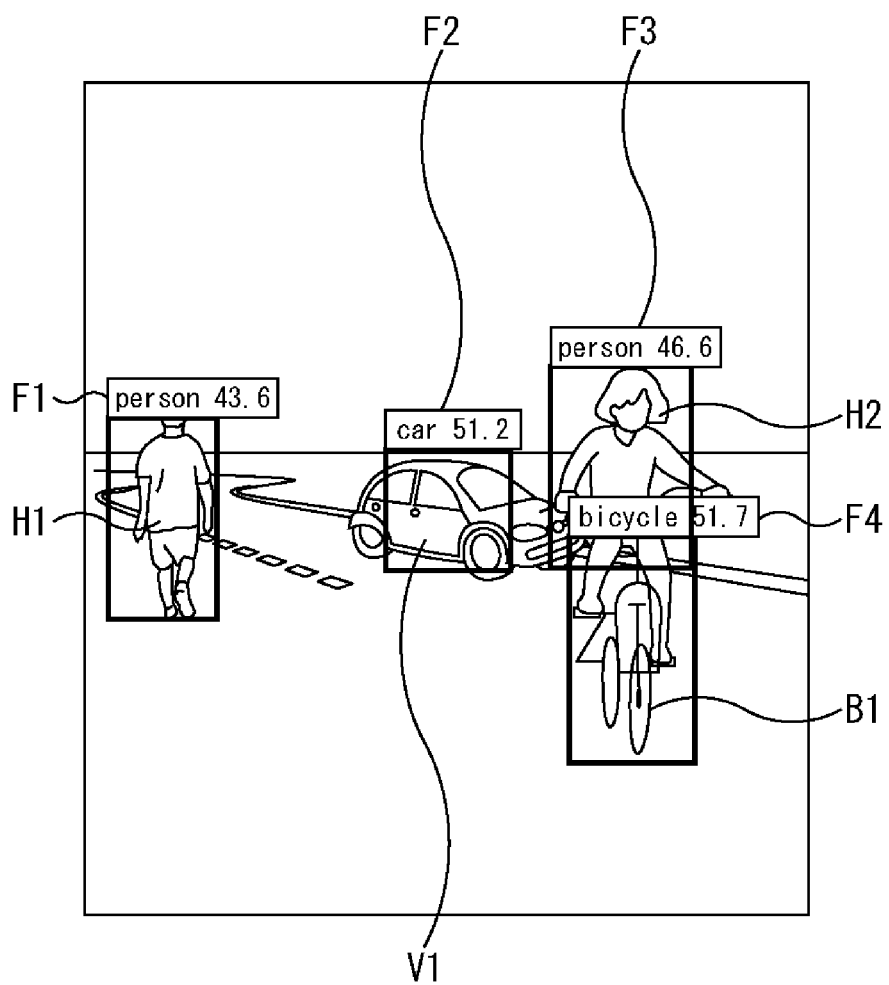
FIG. 6 is a diagram for explaining an example of recognition results of an object recognition process.

For example, in a case where an image as shown in FIG. 6 is supplied from a camera (the camera 91a in FIG. 3, for example) of the data acquisition unit 102, the camera recognition unit 241 outputs a recognition result as shown in frames F1 to F4 in FIG. 6. Meanwhile, the confidence calculation unit 222 calculates confidence, on the basis of the location at which an object that is a recognition result is detected, and the object name.

Specifically, the image in FIG. 6 captures a situation in which a person H1 is walking on the left side, a car V1 is traveling at the center, and a person H2 riding on a bicycle B1 is traveling on the right side.

In such a case, the camera recognition unit 241 outputs a recognition result regarding the person H1 on the right side, as indicated by the frame F1.

The frame F1 indicates that an object is present at the location of the frame F1, "person" is written in the upper left portion, the object name is recognized as "person" through the object recognition process performed by the camera recognition unit 241, "43.6" is written in the upper right portion, and the confidence has been calculated to be 43.6% by the confidence calculation unit 222 on the basis of the recognition result.

That is, the frame F1 indicates that the existence of a person at the location of the frame F1 is recognized with a confidence of 43.6% through the object recognition process.

The camera recognition unit 241 also outputs a recognition result regarding the car V1 at the center, as indicated by the frame F2.

The frame F2 indicates that an object is present at the location of the frame F2, "car" is written in the upper left portion, the object name is recognized as "car" through the object recognition process performed by the camera recognition unit 241, "51.2" is written in the upper right portion, and the confidence has been calculated to be 51.2% by the confidence calculation unit 222 on the basis of the recognition result.

That is, the frame F2 indicates that the existence of a car at the location of the frame F2 is recognized with a confidence of 51.2% through the object recognition process.

Further, the camera recognition unit 241 outputs a recognition result regarding the person H2 on the bicycle B1 on the right side, as indicated by the frames F3 and F4.

The frame F3 indicates that an object is present at the location of the frame F3, "person" is written in the upper left portion, the object name is recognized as "person" through the object recognition process performed by the camera recognition unit 241, "46.6" is written in the upper right portion, and the confidence has been calculated to be 46.6% by the confidence calculation unit 222 on the basis of the recognition result.

Also, the frame F4 indicates that an object is present at the location of the frame F4, "bicycle" is written in the upper left portion, the object name is recognized as "bicycle" through the object recognition process performed by the camera recognition unit 241, "51.7" is written in the upper right portion, and the confidence has been calculated to be 51.7% by the confidence calculation unit 222 on the basis of the recognition result.

That is, the frame F3 indicates that, through the object recognition process, the existence of a bicycle at the location of the frame F3 is recognized with a confidence of 46.6%, and the existence of a person at the location of the frame F4 is recognized with a confidence of 51.7%.

In this manner, the camera recognition unit 241 outputs recognition results including the locations of objects in an image and the object names through an object recognition process. The confidence calculation unit 222 then calculates confidences, on the basis of the locations of the objects and the object names, which are the recognition results.

Example 2

Figure 7:
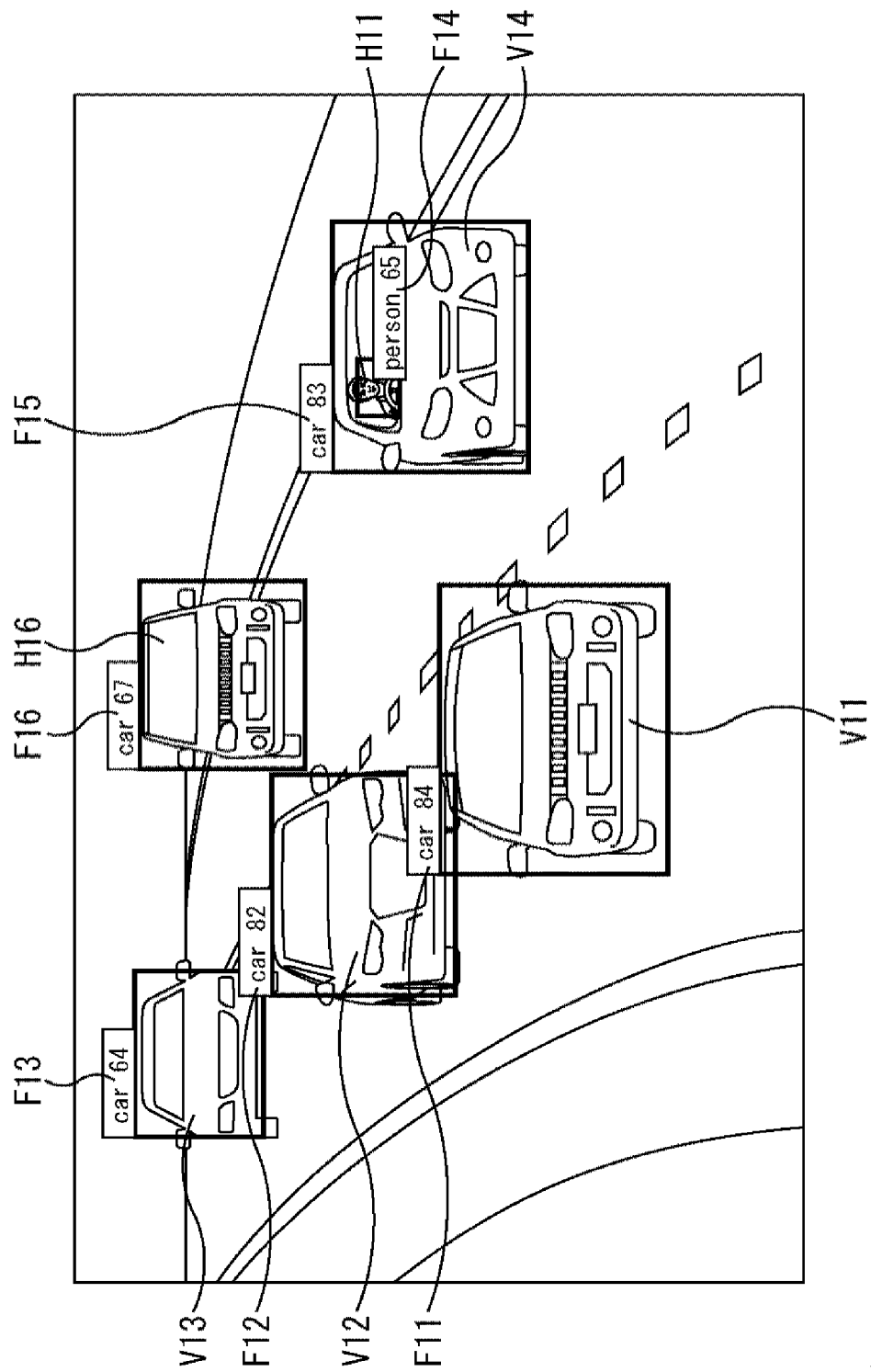
FIG. 7 is a diagram for explaining an example of recognition results of an object recognition process.

Meanwhile, in a case where an image as shown in FIG. 7 is supplied from a camera of the data acquisition unit 102, for example, the camera recognition unit 241 outputs recognition results as indicated by frames F11 to F16 in FIG. 7. The confidence calculation unit 222 also calculates confidences, on the basis of the recognition results.

That is, the image in FIG. 7 captures a situation in which five cars V11 to V15 are traveling.

In such a case, the camera recognition unit 241 outputs recognition results as indicated by frames F1 to F14 and F16 to each of the vehicles V11 to V15.

That is, the frames F1 to F14 and F16 indicate that an object is present at each of the locations of the frames F1 to F14 and F16.

Also, "car" is written in the upper left portion of each of the frames F1 to F14 and F16, indicating that the object name is recognized as "car" through the object recognition process performed by the camera recognition unit 241.

Further, "84", "82", "64", "83", and "67" are written in the upper right portions of the frames F1 to F14 and F16, respectively, indicating that the confidences have been calculated to be 84%, 82%, 64%, 83%, and 67% by the confidence calculation unit 222 on the basis of the recognition results.

That is, through the object recognition process, the recognition results indicate that cars are present at the locations of the frames F1 to F14 and F16 with the confidences of 84%, 82%, 64%, 83%, and 67%, respectively.

The camera recognition unit 241 also outputs a recognition result regarding the car V14 at the center, as indicated by the frame F14.

The frame F14 indicates that "person" is written in the lower right portion, the object name is recognized as "person" through the object recognition process performed by the camera recognition unit 241, "65" is further written on the right side, and the confidence has been calculated to be 65% by the confidence calculation unit 222 on the basis of the recognition result.

That is, through the object recognition process, the recognition result indicates that a person is present at the location of the frame F14 with a confidence of 65%.

In this manner, the camera recognition unit 241 outputs the locations of objects in an image and the object names as recognition results through an object recognition process. The confidence calculation unit 222 then calculates confidences, on the basis of the recognition results.

As described above, the camera recognition unit 241 obtains confidences, in addition to the locations of objects and the object names as the recognition results of an object recognition process.

Note that results obtained through an object recognition process based on results of sensing performed by a sensor other than a camera, such as a LiDAR or a millimeter-wave radar, are not described herein, but the explanation will be continued below on the assumption that those results are basically the same as those obtained with a camera.

<Degradation Evaluation Method>
(Outlier Detection)

The comparison unit 223 compares the confidences in the past object recognition results stored in the storage unit 111 with the confidences calculated by the confidence calculation unit 222 for each kind of sensor, and outputs comparison results to the degradation determination unit 224.

The degradation determination unit 224 evaluates (determines) degradation of the sensors, on the basis of the comparison results supplied from the comparison unit 223.

At this point of time, the comparison unit 223 may determine whether or not the current confidence calculated by the confidence calculation unit 222 is an outlier in comparison with the confidences in the past object recognition results, and output the result as a comparison result.

Here, an outlier is a confidence with which the difference from the average of local densities is larger than a predetermined value, when the average value of the local densities with a predetermined number k of confidences in the neighborhood of each confidence is calculated for each confidence.

Figure 8:
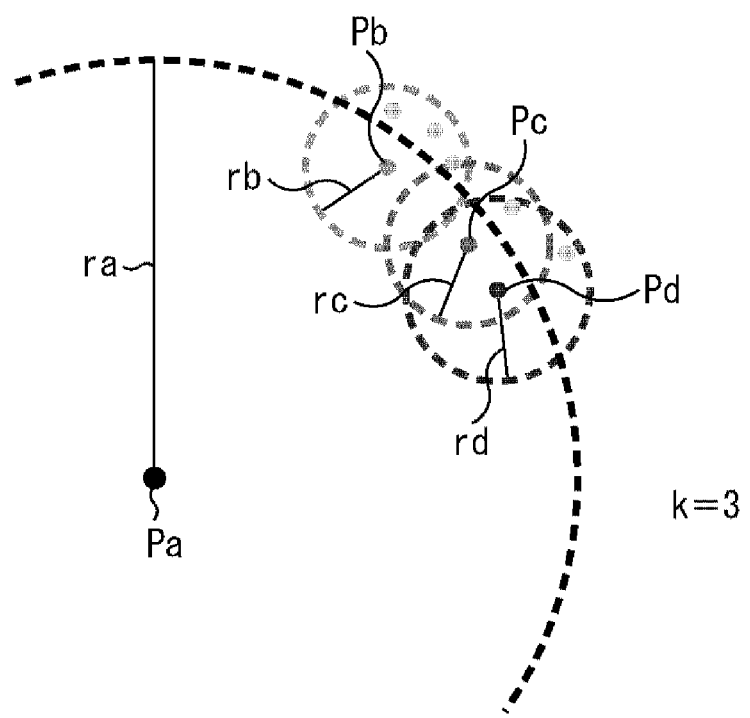
FIG. 8 is a diagram for explaining an example of a degradation determination method (outlier detection) based on recognition results.

More specifically, when there are confidences Pa to Pd as shown in FIG. 8, for example, the reciprocals of the average values of the distances to data groups of k points in the vicinities of the respective confidences are defined as local densities Da to Dd. Note that the confidence Pa is the calculated confidence, and the confidences Pb to Pd are the past stored confidences.

In the case illustrated in FIG. 8, where k=3, the average of the distances from a data group of k (=3) points in the vicinity of the confidence Pa is a distance ra, the average of the distances from a data group of k points in the vicinity of the confidence Pb is a distance rb, the average of the distances from a data group of k points in the vicinity of the confidence Pc is a distance rc, and the average of the distances from a data group of k points in the vicinity of the confidence Pd is a distance rd.

Here, as shown in FIG. 8, the distances ra to rd satisfy ra>rb, ra>rc, and ra>rd.

Accordingly, the local density Da ($\propto 1/ra$) of the confidence Pa is a sufficiently small value, compared with the local densities db to Dd of the confidences Pb to Pd.

Therefore, the confidence Pa is regarded as an outlier with respect to the confidences Pb to Pd.

In view of this, the degradation determination unit 224 may determine (evaluate) that degradation has occurred, when the confidence Pa that is the current calculation result is regarded as an outlier on the basis of the results of comparison performed by the comparison unit 223.

However, it is known that the confidences of recognition results from an object recognition process vary, and an outlier appears with a certain probability even if there is no degradation in any of the sensors.

For this reason, if it is assumed that degradation has occurred when the confidence Pa, which is the current actual measurement value, is regarded as an outlier, there is a possibility that a sensor is regarded as having degraded due to an accidentally generated outlier even though the sensor has not degraded.

Therefore, on the basis of the results of comparison performed by the comparison unit 223, the degradation determination unit 224 may determine that degradation has occurred, in a case where an outlier has appeared successively a predetermined number of times, or when the cumulative number of times an outlier has appeared exceeds a predetermined number even if the occurrence of the outliers is discontinuous, for example.

Alternatively, when the cumulative number of times an outlier has appeared is larger than a first predetermined number of times, but is smaller than a second predetermined number of times that is larger than the first predetermined number of times, the degradation determination unit 224 may determine that self-driving is possible, though the risk increases with the number of outliers. When the cumulative number of times an outlier has appeared exceeds the second predetermined number of times, the degradation determination unit 224 may determine that self-driving is impossible.

(Change Point Detection)

Although an example in which degradation is determined on the basis of an outlier has been described above, the comparison unit 223 may compare an acquired current confidence with a predicted value that is predicted from confidences as the past object recognition results, and determine whether or not the difference between the current confidence and the predicted value is larger than a predetermined value, to output a comparison result.

Figure 9:
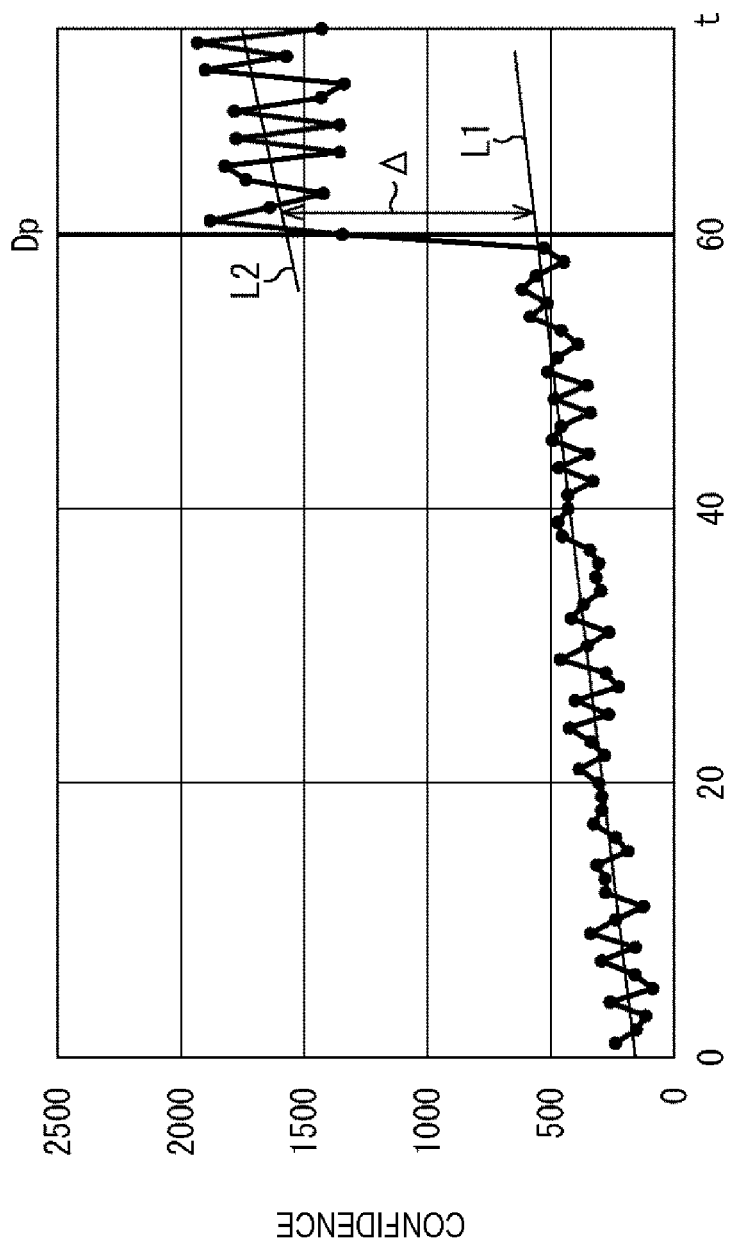
FIG. 9 is a diagram for explaining an example of a degradation determination method (change point detection) based on recognition results.

For example, a case where the ordinate axis indicates confidence while the abscissa axis indicates time as shown in FIG. 9 is now described.

In FIG. 9, in the vicinity of time t0 to time t60, the value of the confidence fluctuates around a predicted value indicated by a straight line L1. However, after time t60, the value fluctuates around a predicted value indicated by a straight line L2.

That is, in a case where the fluctuation of the confidence as shown in FIG. 9 is observed, it can be considered that a significant change point of the confidence as indicated by a difference A occurs around time t60.

The comparison unit 223 calculates a predicted value on the basis of information about the past confidences, calculates and defines the square of the difference from the current confidence as an abnormality, for example, and outputs the result as a comparison result to the degradation determination unit 224.

The degradation determination unit 224 may compare the abnormality with a predetermined threshold. In a case where the abnormality is higher than the predetermined threshold, for example, the degradation determination unit 224 may determine (evaluate) that degradation has occurred.

However, as described above, the confidences in the recognition results of an object recognition process vary, and the abnormality increases with a certain degree of probability even if any degradation is not observed in the sensors.

In view of this, the degradation determination unit 224 may compare the abnormality with a predetermined threshold. In a case where the abnormality remains higher than the predetermined threshold over a predetermined time, for example, the degradation determination unit 224 may determine (evaluate) that degradation has occurred.

Alternatively, when the abnormality level is higher than a first threshold but is lower than a second threshold that is higher than the first threshold, the degradation determination unit 224 may determine that self-driving is possible, though the risk increases with the abnormality level. When the abnormality level exceeds the second threshold, the degradation determination unit 224 may determine that self-driving is impossible.

(Abnormal Portion Detection)

An example in which degradation is determined on the basis of change point detection has been described above. However, in a case where the recognition target 61 moves so as to rotate 360 degrees about a predetermined vertical axis fixed at the same location while changing directions with time but not changing the location, the confidence changes periodically in theory, for example. Therefore, degradation may be determined on the basis of whether or not the periodic change is to continue.

Figure 10:
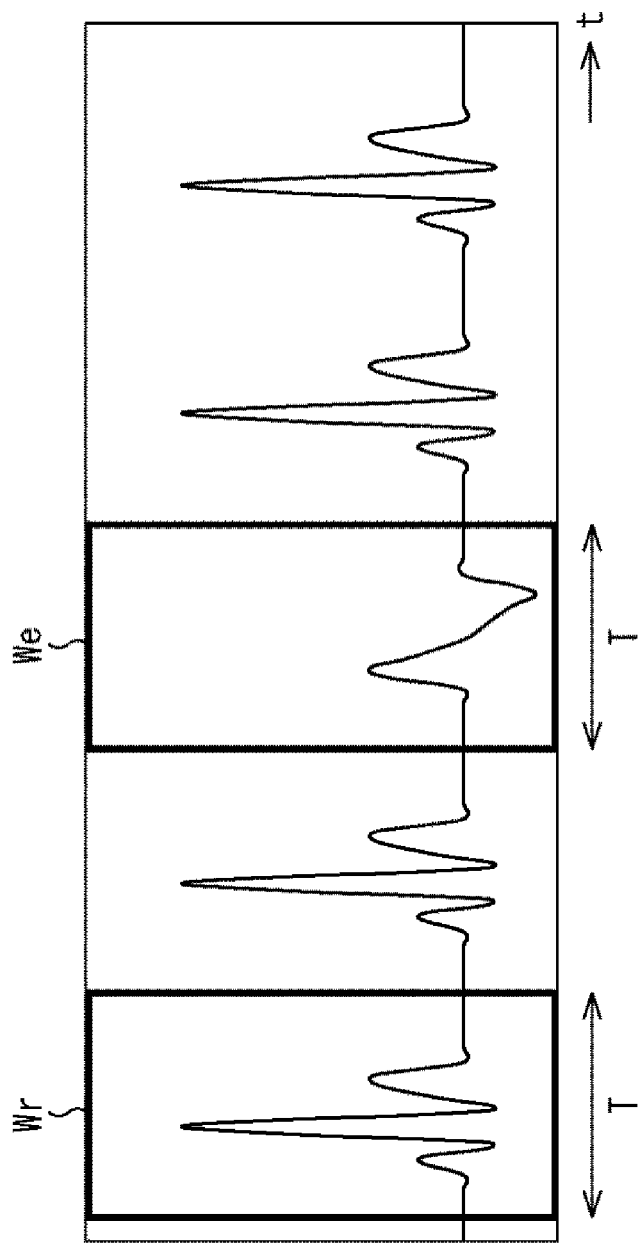
FIG. 10 is a diagram for explaining an example of a degradation determination method (abnormal portion detection) based on recognition results.

As the recognition target 61 is rotated, the confidence shown in FIG. 10 is detected over time, for example.

Note that, in FIG. 10, the ordinate axis indicates confidence, and the abscissa axis indicates time.

Specifically, the waveform Wr of the time-series confidence with a time width T shown in FIG. 10, for example, is repeated with the rotation of the recognition target 61. However, for some reason, the waveform We of the time-series confidence shown at the center of the graph might be detected, instead of the waveform Wr.

Therefore, the comparison unit 223 calculates the waveform Wr of an average time-series confidence on the basis of the similarity of the waveform change to the time-series change in the past time-series confidence, and sequentially compares the time-series confidence waveform Wr with the time-series confidence waveform detected periodically.

Figure 11:
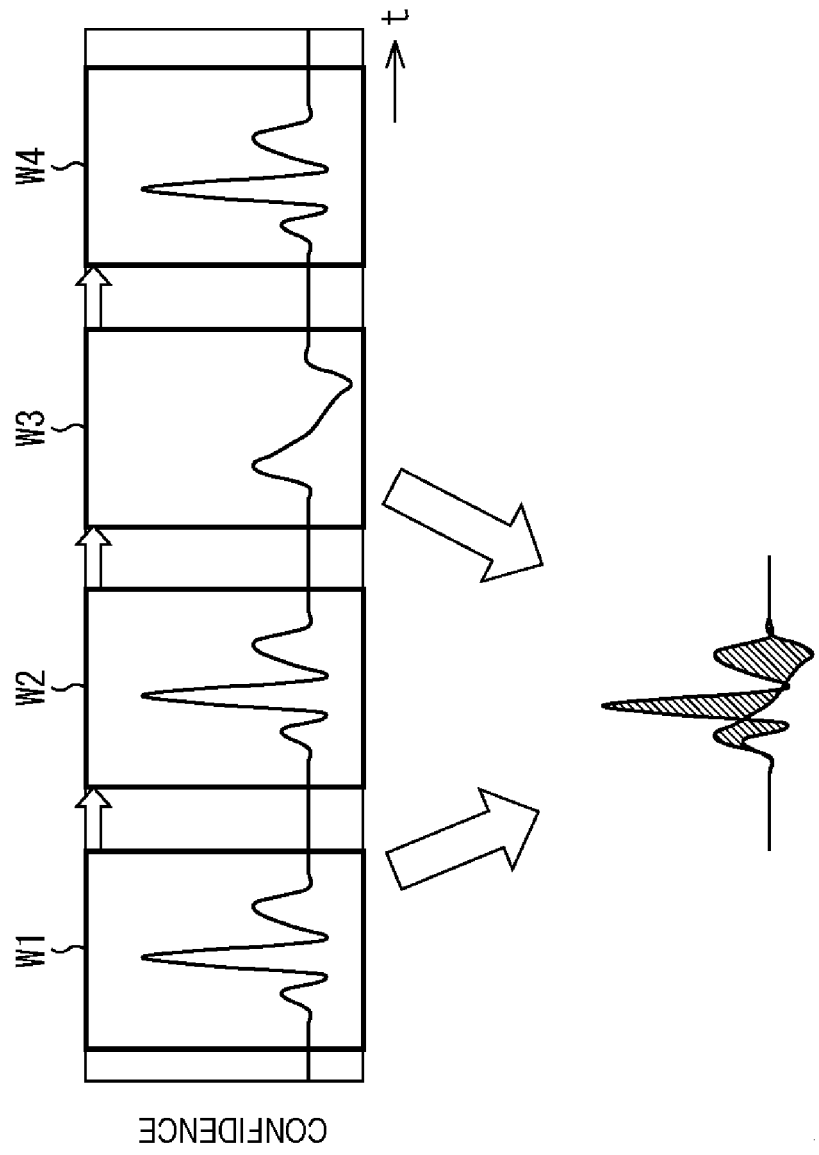
FIG. 11 is a diagram for explaining an example of a degradation determination method (abnormal portion detection) based on recognition results.

For example, as shown in the lower portion of FIG. 11, waveforms W2 and W4 are substantially the same as the waveform W1 of an average time-series confidence, but a waveform W3 is different.

Therefore, to detect the occurrence of such a waveform, the comparison unit 223 may output, as a comparison result, the difference in area between the average waveform W1 of the past time-series confidence and each of the waveforms W2 to W4, to the degradation determination unit 224.

In such a process, the waveforms W2 and W4 are substantially the same as the waveform W1, and accordingly, the area difference is substantially zero.

As for the waveform W3, however, the area difference between the waveform W1 and the waveform W3 is obtained as shown in the lower portion of FIG. 11.

In view of such facts, the comparison unit 223 outputs, as a comparison result, the reference waveform W1 and the magnitude of the area difference to the degradation determination unit 224.

The degradation determination unit 224 may compare the magnitude of the area difference with a predetermined threshold for each waveform of the time-series confidence, to determine (evaluate) the presence/absence of a partially time-sires abnormal portion in which the time-series confidence degrades and an abnormality occurs.

Furthermore, as described above, it is known that the confidences of recognition results from an object recognition process vary, and confidence variation occurs with a certain probability even if there is no degradation in any of the sensors.

In view of this, the degradation determination unit 224 may compare the magnitude of the area difference with a predetermined threshold. In a case where the area difference is larger than the predetermined threshold, for example, the degradation determination unit 224 may determine (evaluate) that an abnormal portion has appeared, and degradation has occurred.

Alternatively, when the area difference is larger than a first threshold but is smaller than a second threshold that is greater than the first period, the degradation determination unit 224 may determine that self-driving is possible, though the risk increases with the magnitude of the area difference. When the area difference exceeds the second threshold, the degradation determination unit 224 may determine that self-driving is impossible.

Degradation Diagnosis Process According to the First Embodiment

Figure 12:
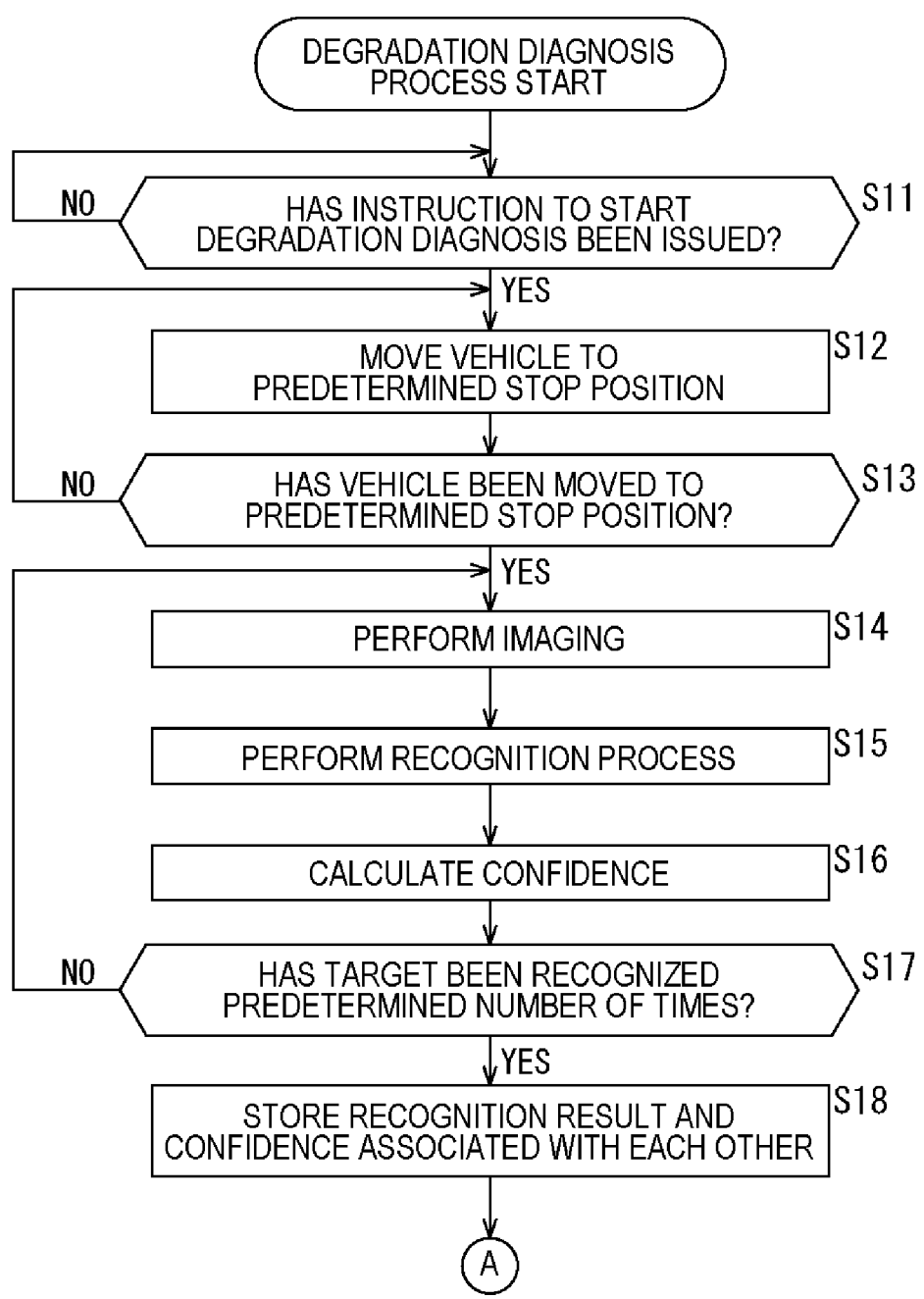
FIG. 12 is a flowchart for explaining a degradation diagnosis process according to the first embodiment.
Figure 13:
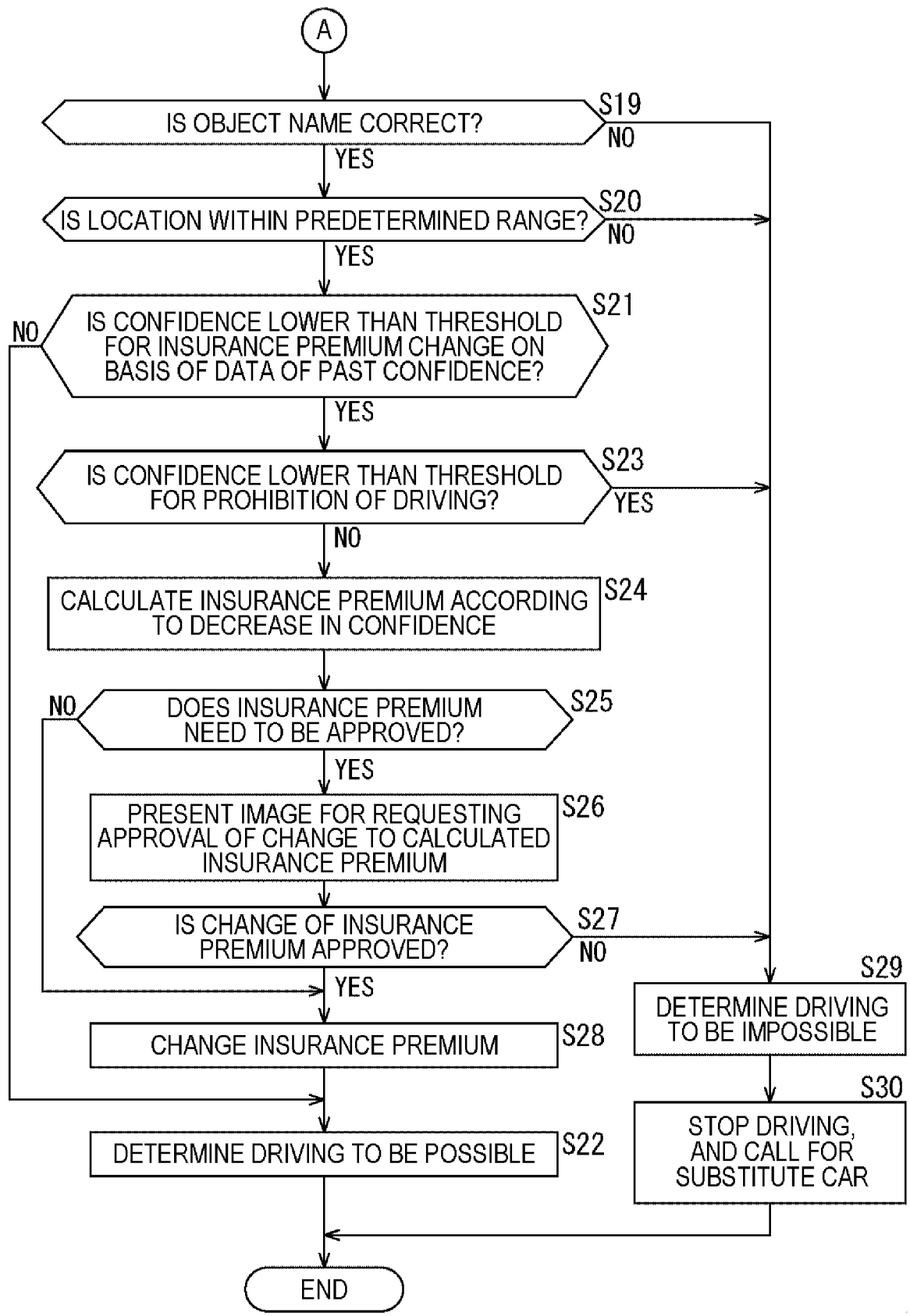
FIG. 13 is a flowchart for explaining the degradation diagnosis process according to the first embodiment.

Next, a degradation diagnosis process according to the first embodiment is described with reference to flowcharts in FIGS. 12 and 13.

Note that processes to be performed in a case where the camera recognition unit 241 performs an object recognition process on the basis of a captured image that is a result of sensing performed by a camera of the data acquisition unit 102 are described herein. However, the other sensors are basically the same in performing an object recognition process based on a result of sensing, and therefore, explanation thereof is not made herein. Also, a plurality of sensors is also subjected to processing in parallel, and a degradation diagnosis process is performed in a similar manner.

In step S11 (FIG. 12), the degradation determination unit 224 of the degradation diagnosis unit 182 passes through the testing site 51 located near the entrance when entering a residential area during self-driving, for example, and therefore, determines whether or not an instruction to start degradation diagnosis has been issued, on the basis of whether or not to pass through the testing site.

If the passage through the testing site 51 has not been detected, and an instruction to start degradation diagnosis has not been issued in step S11, a similar process is repeated.

If an instruction to start degradation diagnosis has been issued in step S11 at the time of the passage through the testing site 51 located near the entrance to a residential area, the process moves on to step S12.

In step S12, the degradation determination unit 224 notifies the situation recognition unit 153 that an instruction to start degradation diagnosis has bene issued.

In response to this, the situation recognition unit 153 instructs the planning unit 134 to move the vehicle 91 to a predetermined stop position P in the testing site 51, and the planning unit 134 makes a corresponding moving plan and controls the operation control unit 135 to move the vehicle 91 to stop at the stop position P.

In step S13, the degradation determination unit 224 determines whether or not the vehicle 91 has stopped at the predetermined stop position P. If the vehicle has not stopped at the predetermined stop position P, the process returns to step S12.

Until the vehicle 91 stops at the predetermined stop position P, the processes in steps S12 and S13 are repeated, and the moving is continued so that the vehicle 91 can stop at the stop position P.

If the vehicle 91 has stopped at the predetermined stop position P in step S13, the process then moves on to step S14.

In step S14, a camera (the camera 91*a*, for example) of the data acquisition unit 102 captures an image including the recognition target 61 located at a predetermined distance in a predetermined direction while the vehicle 91 is stopped at the predetermined position P, and outputs the captured image to the camera recognition unit 241. At this point of time, the location information acquisition unit 245 acquires location information about the subject vehicle from the GPS of the data acquisition unit 102, and time information, and supplies the location information and the time information to the recognition result acquisition unit 221.

Note that, at the point of time when the vehicle 91 stops at the predetermined stop position P, the recognition target 61 is located at a predetermined distance in a predetermined direction, which means that the vehicle 91 and the recognition target 61 are maintained in a predetermined positional relationship.

In step S15, the camera recognition unit 241 performs an object recognition process on the basis of the image captured by the camera 91a, and outputs a recognition result that is information about the location of the recognition target with respect to the vehicle 91 and the name of the recognized object, to the recognition result acquisition unit 221.

In step S16, the recognition result acquisition unit 221 outputs the recognition result to the confidence calculation unit 222, and causes the confidence calculation unit 222 to calculate and store the confidence of the recognition result.

In step S17, the recognition result acquisition unit 221 determines whether or not the recognition target 61 has been recognized a predetermined number of times.

If it is determined in step S17 that the recognition target 61 has not been recognized the predetermined number of times, the process returns to step S14.

That is, the processes in steps S14 to S17 are repeated until an image of the recognition target 61 captured by the camera 91a or the like is subjected to an object recognition process the predetermined number of times.

If it is determined in step S17 that an object recognition process has been performed on an image of the recognition target 61 captured by the camera 91a or the like the predetermined number of times, the process then moves on to step S18.

In step S18, the recognition result acquisition unit 221 averages recognition results including the location and the object name of the recognition target 61, and the predetermined number of pieces of information about the confidence, associates the result with the location information about the subject vehicle supplied from the location information acquisition unit 245 and the time information, and stores the result into the storage unit 111.

Here, the averaging of the predetermined number of pieces of information about the confidence may be the average value of the confidences repeatedly calculated the predetermined number of times, or may be the average value of the confidences excluding any value greatly deviated from the confidences repeatedly calculated the predetermined number of times, for example. Here, an outlier may be a value with a confidence of about 60% of the average value when the total average of the confidences is 80%, for example. That is, an outlier may be a value with a confidence of 48% or lower.

In step S19 (FIG. 13), the comparison unit 223 compares the object name based on the current recognition result stored in the storage unit 111 with the correct object name, and supplies the comparison result to the degradation determination unit 224. On the basis of the comparison result, the degradation determination unit 224 determines whether or not the object name in the object recognition result is correct, or is an object name similar to the correct object name.

If it is determined in step S19 that the object name in the object recognition result is correct or is an object name similar to the correct object name, the process moves on to step S20.

In step S20, the comparison unit 223 compares the location as a recognition result based on the current recognition result stored in the storage unit 111 with the correct location, and supplies the comparison result to the degradation determination unit 224. On the basis of the comparison result, the degradation determination unit 224 determines whether or not the location as a recognition result is within the allowable range with respect to the correct location.

Here, whether or not the location as a recognition result is within the allowable range with respect to the correct location is whether or not the distance between the location as a recognition result and the correct location is within a predetermined distance and is recognized with a predetermined accuracy.

If it is determined in step S20 that the location as a recognition result is within the allowable range with respect to the correct position, the process moves on to step S21.

In step S21, the comparison unit 223 compares the calculated current confidence with the accumulated confidences stored in the storage unit 111, and outputs a comparison result to the degradation determination unit 224. On the basis of the comparison result, the degradation determination unit 224 determines whether or not the degradation determined from the current confidence is lower than a threshold at which a change needs to be made to the insurance premium.

The determination here may be made through at least one detecting operation of the outlier detection, the change point detection, and the abnormal portion detection described with reference to FIG. 8, or through a combination thereof or the like, for example.

If it is determined in step S21 that the degradation determined from the current confidence is not lower than the threshold at which a change needs to be made to the insurance premium, the process moves on to step S22.

In step S22, the degradation determination unit 224 determines that there is no influence of degradation, determines that traveling by self-driving is possible, and notifies the situation recognition unit 153 of the determination. Thus, the self-driving by the vehicle 91 is continued.

If it is determined in step S21 that the degradation determined from the current confidence is lower than the threshold at which a change needs to be made to the insurance premium, on the other hand, the process moves on to step S23.

In step S23, on the basis of the comparison result, the degradation determination unit 224 determines whether or not the degradation determined from the current confidence is lower than a threshold at which traveling is regarded as impossible.

If it is determined in step S23 that the degradation determined from the current confidence is not lower than the threshold at which traveling is regarded as impossible on the basis of the comparison result, the process moves on to step S24.

In step S24, the degradation determination unit 224 causes the insurance premium determination unit 225 to calculate the insurance premium in accordance with the current degree of degradation.

In step S25, the degradation determination unit 224 determines whether or not the insurance premium calculated by the insurance premium determination unit 225 in accordance with the degradation is higher than a predetermined amount that requires approval of update from the user or the owner.

If it is determined in step S25 that the insurance premium calculated by the insurance premium determination unit 225 in accordance with the degradation is higher than the predetermined amount that requires approval of update from the user or the owner, the process moves on to step S26.

In step S26, on the basis of information about the insurance premium calculated by the insurance premium determination unit 225 in accordance with the degradation, the degradation determination unit 224 controls the UI display control unit 226 to display an image for requesting the user or the owner of the vehicle 91 to approve update of the insurance premium.

Figure 14:
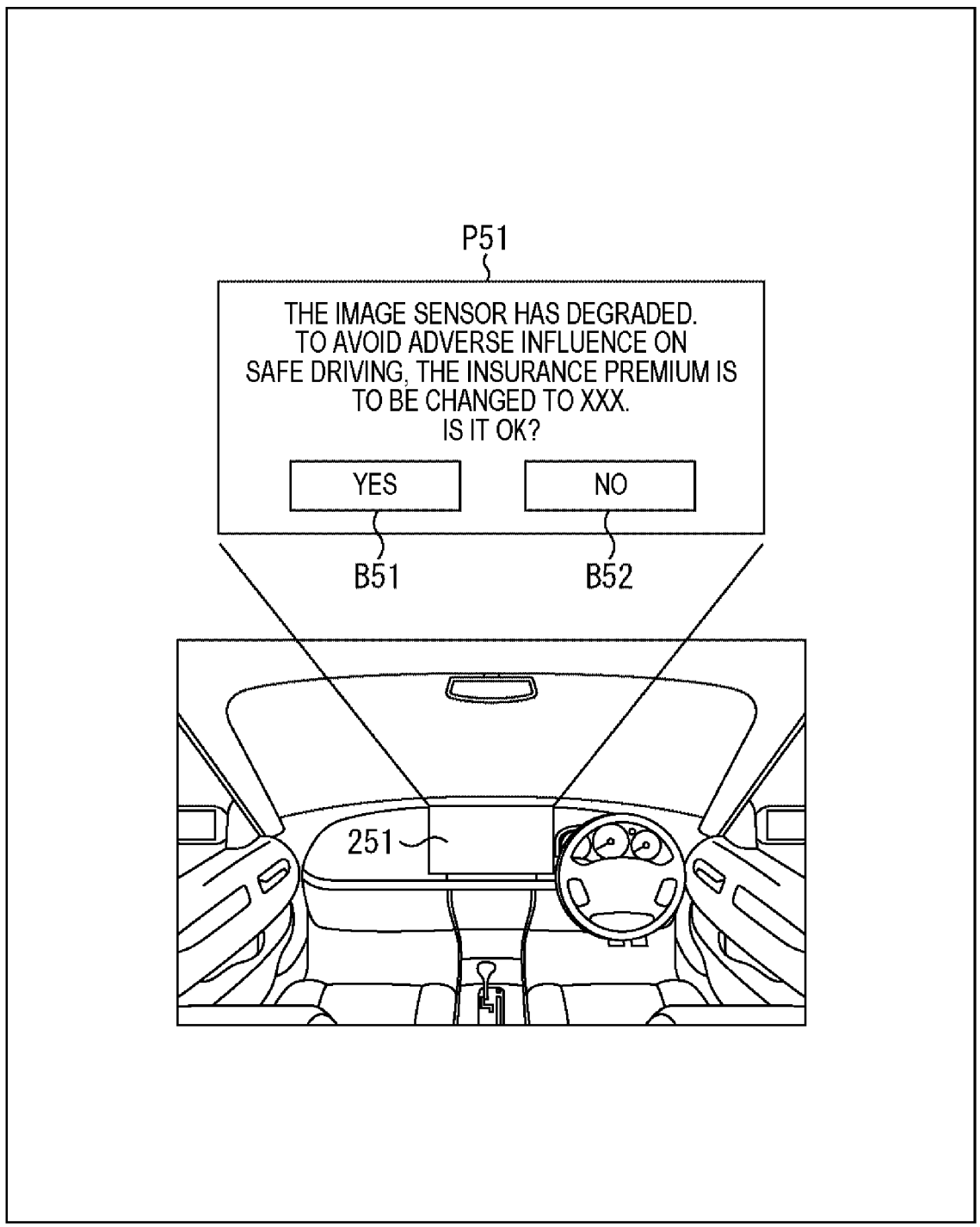
FIG. 14 is a diagram for explaining an example image for requesting approval of update of the insurance premium.

For example, as shown in FIG. 14, in a case where the UI display control unit 226 displays an image on a display device 251 of the output unit 106 in the vehicle and requests approval from the user, an image for requesting approval of update of the insurance premium may be displayed as indicated by an image P51.

The image P51 shows a message that reads "The image sensor has degraded. To avoid adverse influence on safe driving, the insurance premium is to be changed to XXX. Is it OK?". The image P51 also shows a "YES" button B51 to be operated when the update is approved, and a "NO" button B52 to be operated when the update is not approved.

Figure 15:
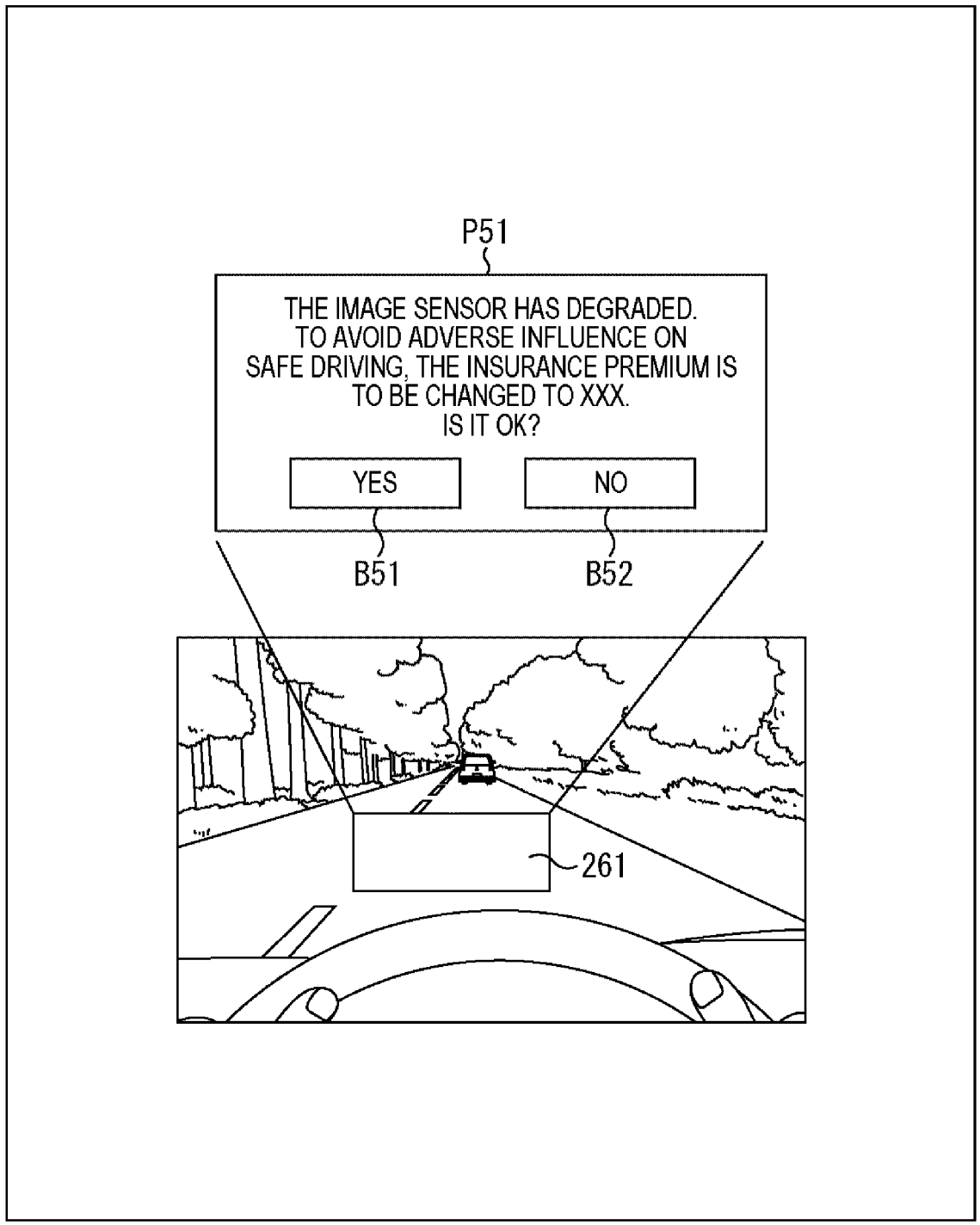
FIG. 15 is a diagram for explaining an example image for requesting approval of update of the insurance premium.

Also, as shown in FIG. 15, the UI display control unit 226 may request approval from the user by displaying the image P51 on a projection image 261 that is displayed on the windshield by a projection device of the output unit 106 in the vehicle. Note that the projection image may be projected and displayed by a head mount display or the like, for example.

Figure 16:
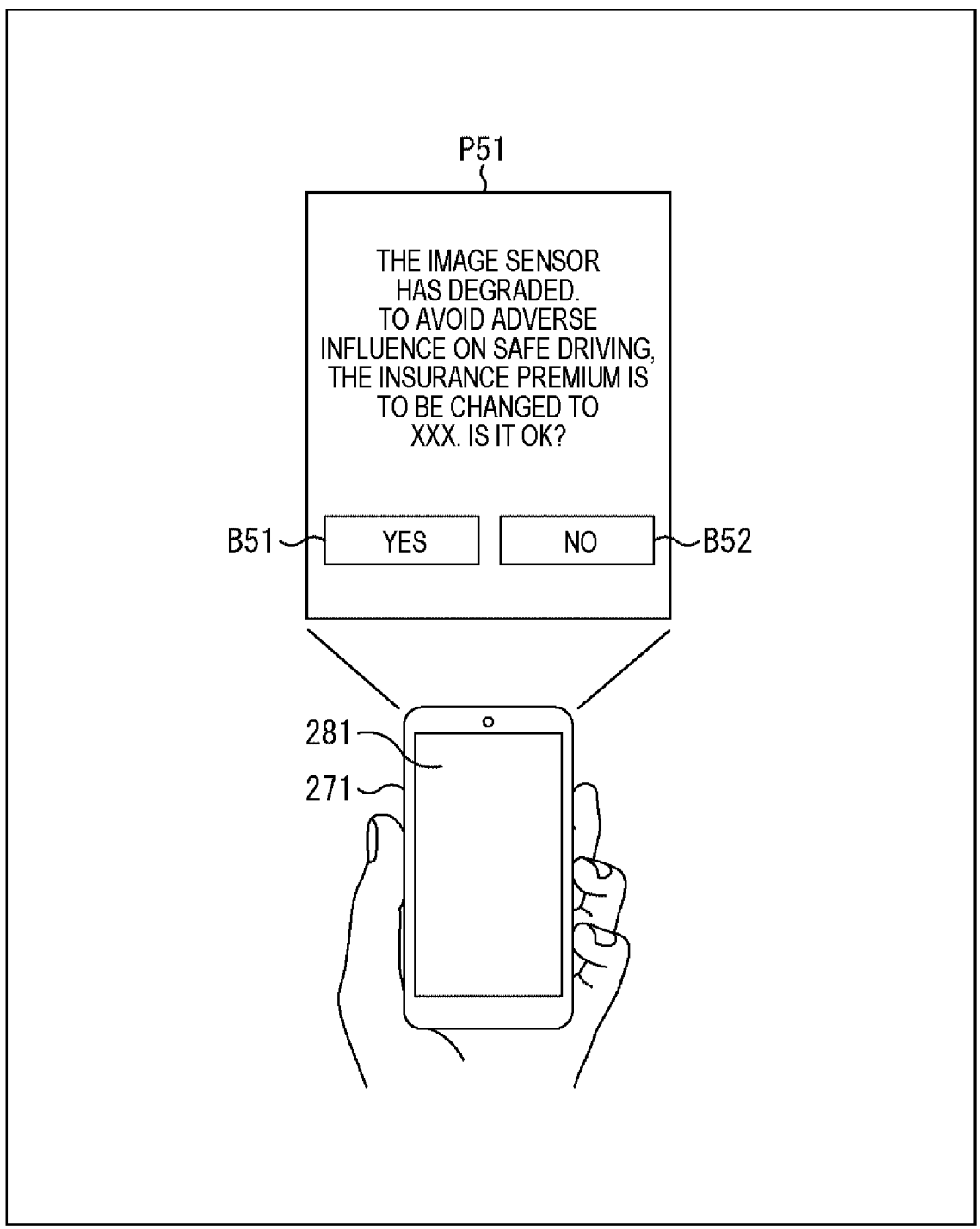
FIG. 16 is a diagram for explaining an example image for requesting approval of update of the insurance premium.

Further, as shown in FIG. 16, the UI display control unit 226 may control the communication unit 103, to display the image P51 on a display unit 281 of a terminal device 271 being carried by the user, and request approval from the user.

Figure 17:
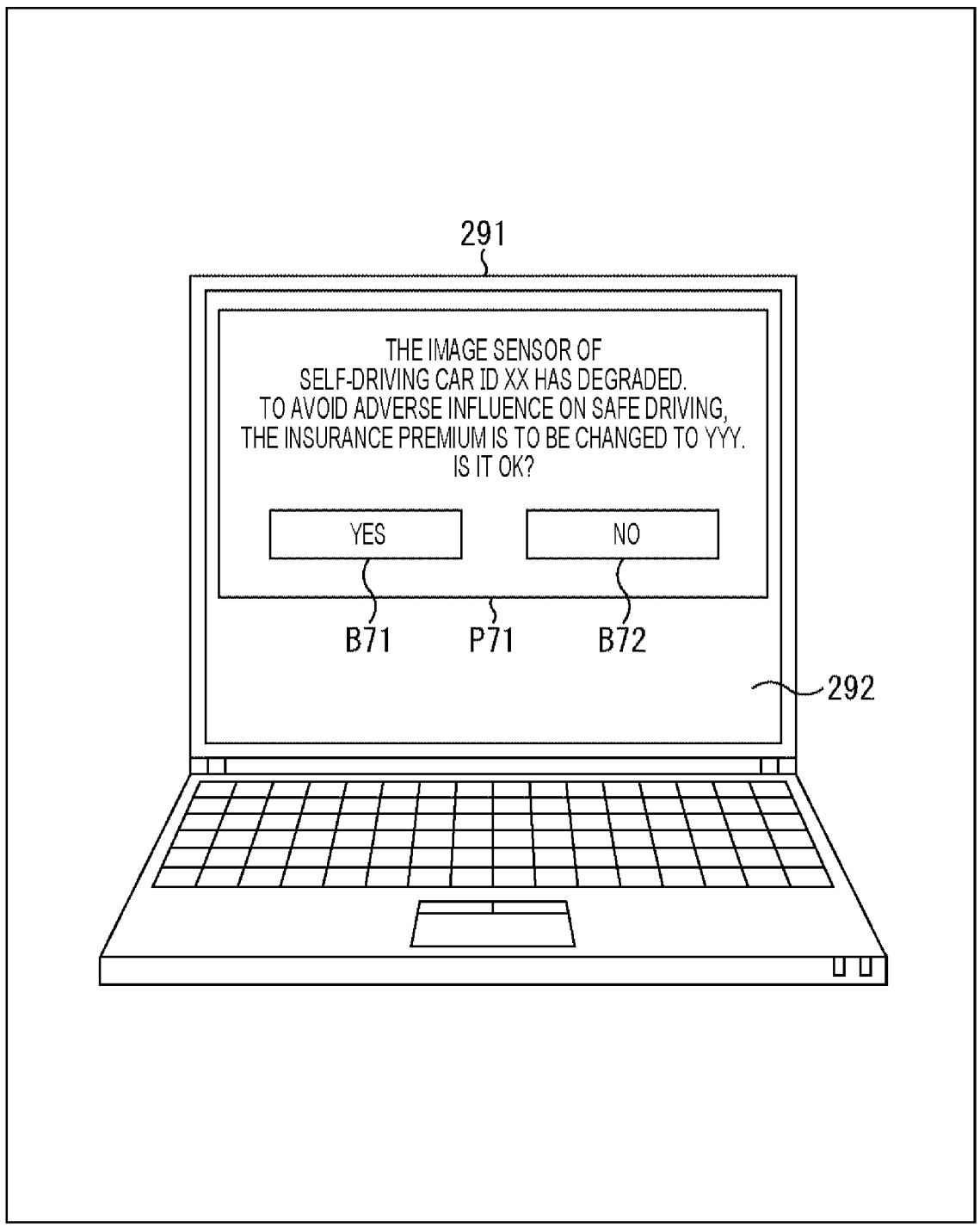
FIG. 17 is a diagram for explaining an example image for requesting approval of update of the insurance premium.

Also, the UI display control unit 226 may control the communication unit 103, to notify the owner of the vehicle 91, who is not in the vehicle 91, by e-mail or the like sent to a personal computer 291 or the like owned by the owner, as shown in FIG. 17, for example. In this manner, the UI display control unit 226 can cause a display unit 292 to display an image for requesting approval of the update of the insurance premium, as indicated by an image P71.

The image P71 shows a message that reads "The image sensor of the self-driving car ID XX has degraded. To avoid adverse influence on safe driving, the insurance premium is to be changed to YYY. Is it OK?". The image P71 also shows a "YES" button B71 to be operated when the update is approved, and a "NO" button B72 to be operated when the update is not approved.

Figure 18:
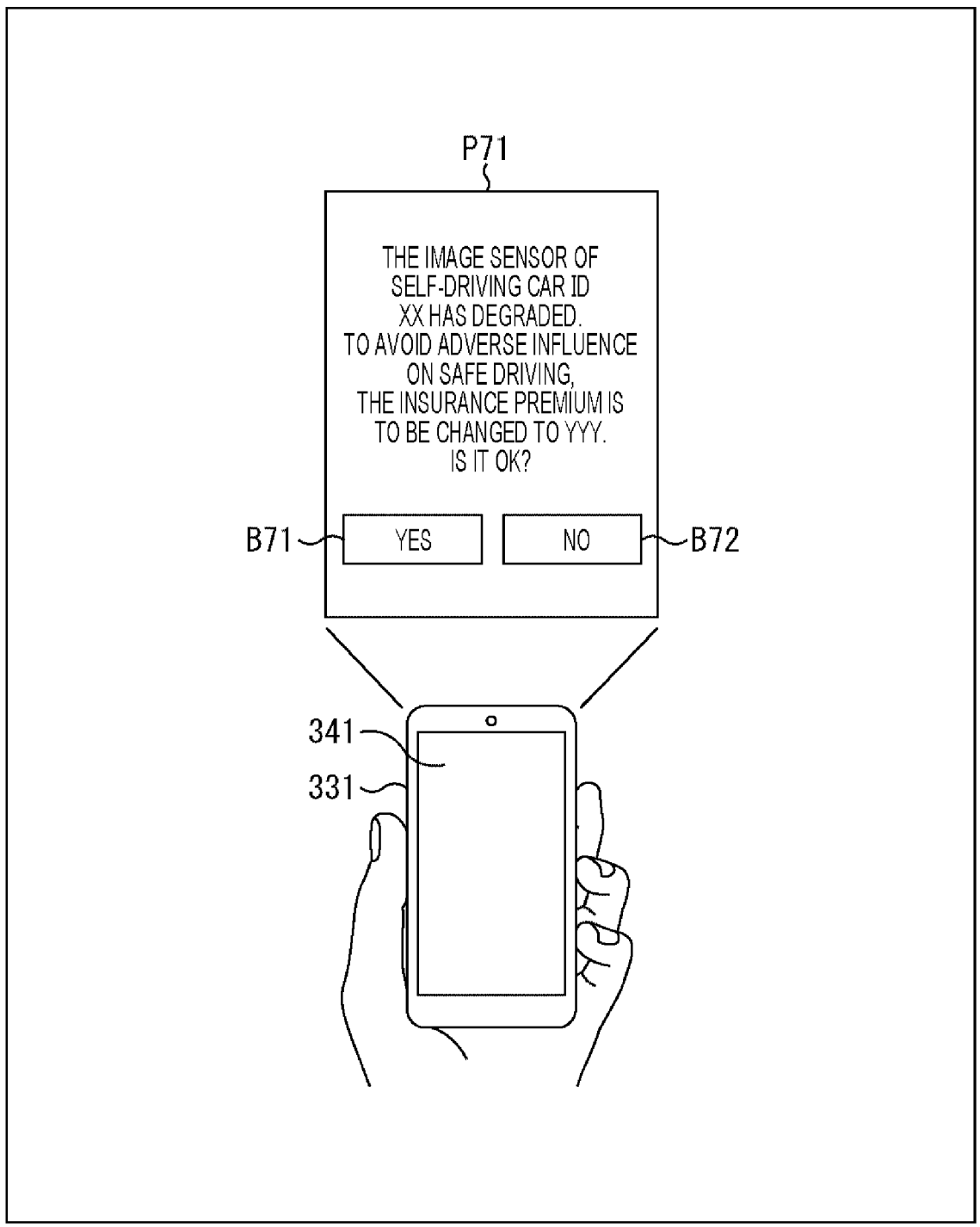
FIG. 18 is a diagram for explaining an example image for requesting approval of update of the insurance premium.

Also, the UI display control unit 226 may control the communication unit 103, to notify the owner of the vehicle 91, who is not in the vehicle 91, by e-mail or the like sent to a display unit 341 or the like of a terminal device 331 owned by the owner, as shown in FIG. 18, for example. In this manner, the UI display control unit 226 can cause the display unit 341 or the like to display an image for requesting approval of the update of the insurance premium, as indicated by the image P71.

In step S27, the degradation determination unit 224 determines whether or not the update of the insurance premium is approved, in accordance with the display of an image for requesting approval of the update of the insurance premium described above with reference to FIGS. 14 to 18.

If it is determined in step S27 that the update of the insurance premium is approved by operating the button B51 in FIGS. 14 to 16 or the button B71 in FIGS. 17 and 18, the process moves on to step S28.

In step S28, the degradation determination unit 224 controls the communication unit 103, to access the insurance company's server that is not shown in the drawings, and update the contract with the approved insurance premium. The process then moves on to step S222.

That is, in this case, to cope with the risk according to the level of degradation while recognizing the occurrence of degradation, the insurance premium is recalculated. When the recalculated insurance premium is higher than a predetermined amount that requires the user's or owner's approval of the update of the insurance premium, and is approved, the insurance contract is updated with the approved insurance premium, and the self-driving is allowed to continue.

On the other hand, if it is determined in step S19 that the object name in the object recognition result is neither the correct object name nor an object name similar to the correct object name, if it is determined in step S23 that the determined degradation is lower than the threshold at which traveling is regarded as impossible, or if it is determined in step S27 that the update of the insurance premium is disapproved by operating the button B52 in FIGS. 14 to 16 or the button B72 in FIGS. 17 and 18, the process moves on to step S29.

In step S29, the degradation determination unit 224 determines that traveling by self-driving is impossible due to the influence of the degradation, and notifies the situation recognition unit 153 of the determination. Thus, the self-driving by the vehicle 91 is suspended.

In step S30, the degradation determination unit 224 controls the communication unit 103, to call for a substitute vehicle capable of self-driving, in place of the vehicle 91, as necessary.

Further, if it is determined in step S25 that the insurance premium calculated by the insurance premium determination unit 225 in accordance with the degradation is not higher than the predetermined amount that requires approval of update from the user or the owner, the processes in steps S26 and S27 are skipped.

That is, in a case where the recalculated insurance premium is a small amount that does not require approval of update from the user or the owner, the insurance contract is automatically updated with the insurance premium recalculated to cope with the risk according to the level of degradation while recognizing the occurrence of degradation, without requesting approval from the user or the owner. The self-driving is then continued.

In a case where the results of the above series of processes show that the object name in the object recognition result is correct, the location recognition result is within a predetermined range, and the degradation of the confidence is not so high as to change the insurance premium, the self-driving is continued.

Also, in a case where the object name in the object recognition result is correct, the location recognition result is within the predetermined range, the degradation of the confidence requires a change in the insurance premium, and self-driving is not impossible, the insurance premium corresponding to the degradation is recalculated. When the recalculated insurance premium is lower than a predetermined amount, the insurance contract is automatically updated with the recalculated insurance premium, and the self-driving is continued. When the recalculated insurance premium is higher than the predetermined amount, approval of the contract update with the recalculated insurance premium is requested. When the update is approved in response to the request, the contract is updated with the recalculated insurance premium, and the self-driving is continued.

Further, in a case where the object name in the object recognition result is not correct, the location recognition result is not within the predetermined range, or the degradation of the confidence is at such a level as to require a change of the insurance premium, when the update of the insurance premium is not approved, and the degradation further worsens to disable self-driving, the self-driving is suspended.

Also, degradation diagnosis is conducted for a camera among the sensors in the example process described above. However, a degradation diagnosis process similar to the above can be performed on all the sensors included in the data acquisition unit 102.

When degradation of any of the sensors is detected through this process, it is possible to determine whether or not self-driving is possible, in accordance with the degree of degradation.

As a result, it is possible to determine whether or not self-driving is possible before the sensor breaks down completely. Thus, the risk of occurrence of an accident due to a breakdown can be lowered.

Note that, in a case where degradation is observed in a plurality of sensors, the insurance premium may be calculated so as to be an amount that corresponds to the number of sensors or the like in which the degradation is observed, in addition to the degree of the degradation of the sensors.

3. Modification of the First Embodiment

In the example described above, the recognition result acquisition unit 221 associates recognition results including locations and object names with confidences, and stores them into the storage unit 111. The comparison unit 223 compares the confidences accumulated in the past with the calculated confidence, and outputs the comparison result to the degradation determination unit 224. On the basis of the comparison result, the degradation determination unit 224 determines degradation.

However, the storage unit 111 and the insurance premium determination unit 225 may be provided in a cloud server, to communicate via the communication unit 103, store recognition results and confidences associated with each other, and calculate and determine an insurance premium.

Figure 19:
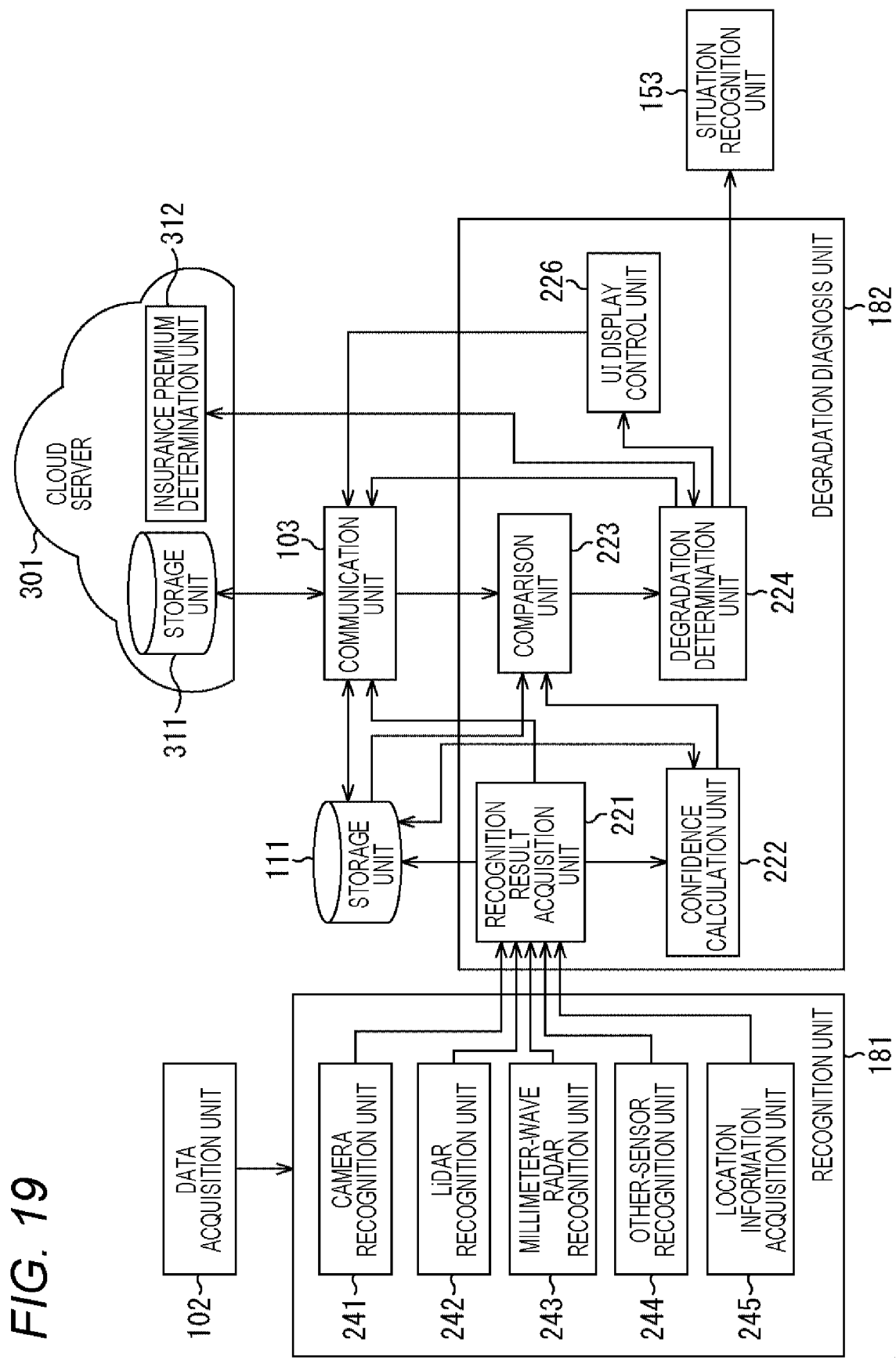
FIG. 19 is a block diagram for explaining an example configuration of a modification of the first embodiment of a degradation diagnosis unit of the present disclosure.

That is, FIG. 19 shows an example configuration of the degradation diagnosis unit 182, with the storage unit 111 and the insurance premium determination unit 225 being provided in a cloud server.

Figure 5:
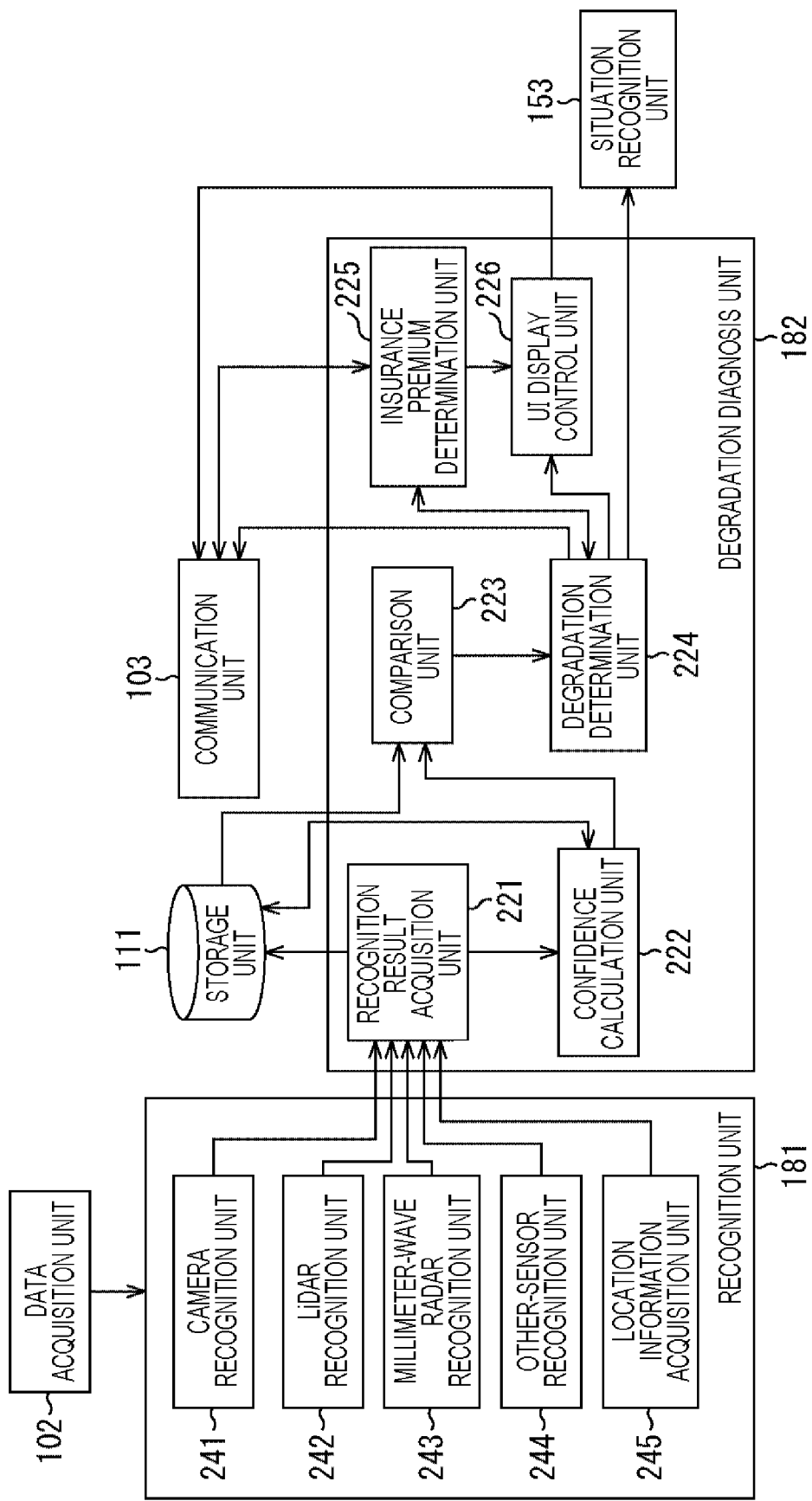
FIG. 5 is a block diagram for explaining an example configuration of a first embodiment of a degradation diagnosis unit of the present disclosure.

Note that, of the components of the degradation diagnosis unit 182 shown in FIG. 19, components having the same functions as those of the degradation diagnosis unit 182 in FIG. 5 are denoted by the same reference numerals used in FIG. 5, and explanation thereof is skipped herein as appropriate.

That is, the degradation diagnosis unit 182 in FIG. 19 differs from the degradation diagnosis unit 182 in FIG. 5 in that the insurance premium determination unit 225 is excluded, and a cloud server 301 that can communicate with the communication unit 103 via a network or the like includes a storage unit 311 that functions like the storage unit 111, and an insurance premium determination unit 312.

With such a configuration, even if the storage unit 111 breaks down due to aging degradation, for example, restoration can be performed with the use of the backup recognition results and confidences stored in the storage unit 311 in the cloud server 301.

Also, the storing of recognition results associated with confidences in the storage unit 111 may be eliminated, and recognition results and confidences may be stored only in the storage unit 311 so that the recognition results and the confidences can be exchanged via the communication unit 103 as necessary.

Further, being provided in the cloud server 301 managed by the insurance company, for example, the insurance premium determination unit 312 may be able to calculate an insurance premium and smoothly update the contract with the newly calculated insurance premium.

Furthermore, the confidence calculation unit 222, the comparison unit 223, and the degradation determination unit 224 may also be provided in the cloud server 301.

Note that the degradation diagnosis process by the degradation diagnosis unit 182 in FIG. 19 is basically similar to the process by the degradation diagnosis unit 182 in FIG. 5, and therefore, explanation thereof is not made herein.

4. Second Embodiment

In the example described above, the self-driving vehicle 91 performs a degradation diagnosis process independently in the testing site 51. However, a plurality of vehicles 91 may upload recognition results and confidences to a cloud server, and perform degradation diagnosis on the basis of the recognition results and the confidences of the other vehicles 91.

In this case, the degradation diagnosis may be performed, with the models of the sensors, the operating times, and the like being taken into consideration.

Figure 20:
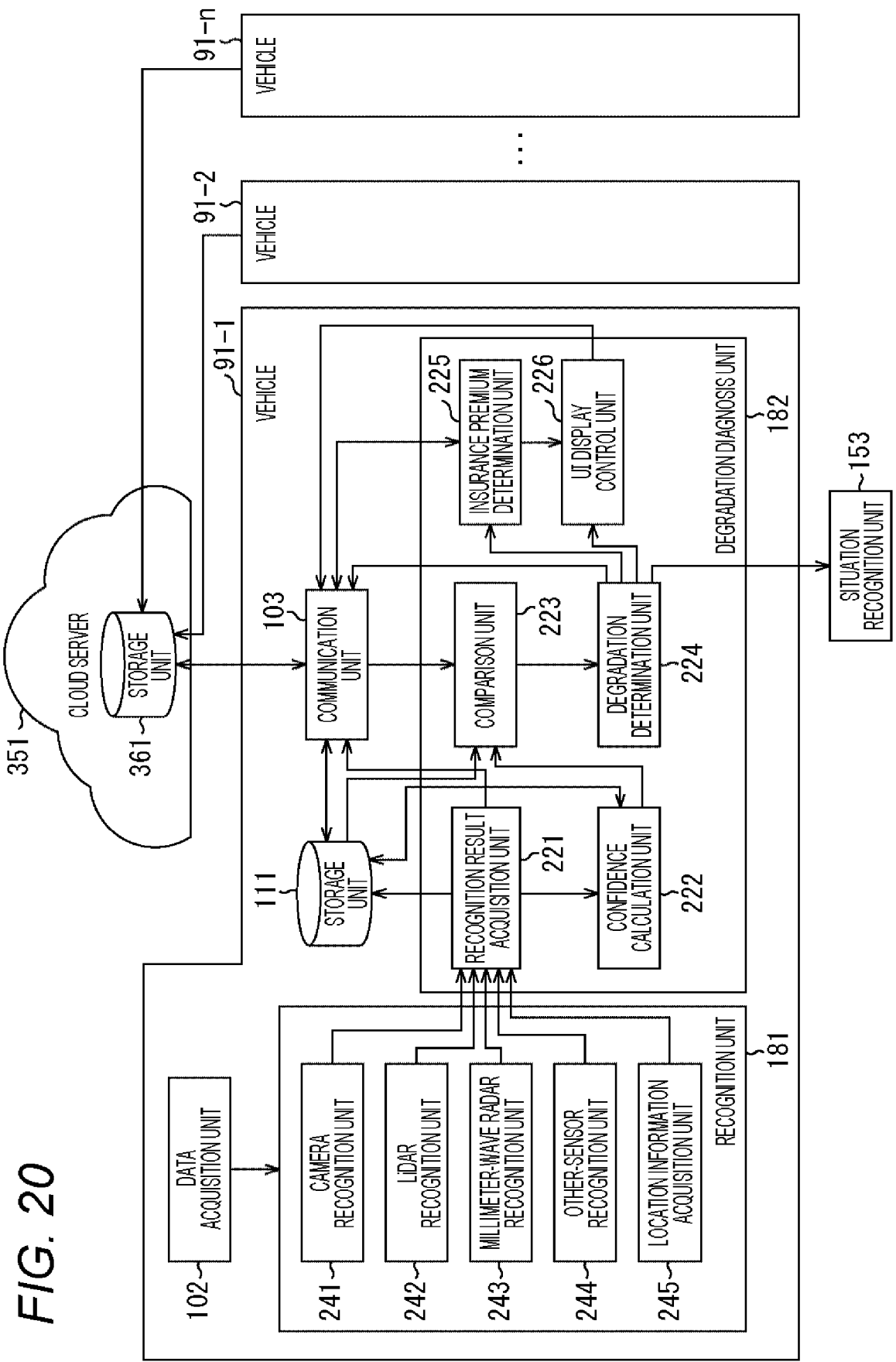
FIG. 20 is a block diagram for explaining an example configuration of a second embodiment of a degradation diagnosis unit of the present disclosure.

FIG. 20 shows an example configuration of a degradation diagnosis unit 182 that performs degradation diagnosis on the basis of recognition results and confidences of the other vehicles 91 in a case where a plurality of vehicles 91 uploads recognition results and confidences to a cloud server.

The functions of the respective components of the degradation diagnosis unit 182 in FIG. 20 are basically similar to those of the components shown in FIG. 5, except that the recognition result acquisition unit 221 stores recognition results and confidences into the storage unit 111, and controls the communication unit 103 to transmit and store the recognition results and the confidences stored in the storage unit 111 into a storage unit 361 of a cloud server 351.

The cloud server 351 sequentially accumulates, in the storage unit 361, the recognition results and the confidences supplied from a plurality of vehicles 91-1 to 91-*n*.

Further, the comparison unit 223 in FIG. 20 controls the communication unit 103, to perform comparison on the basis of information about the recognition results and the confidences of sensors that have similar operating times and are of the same model as or a model similar to the sensor of the subject vehicle 91, among the past recognition results and confidences of the other vehicles 91 stored in the cloud server 351. The result of the comparison is output to the degradation determination unit 224.

That is, the comparison unit 223 compares the recognition result and the confidence of the subject vehicle with the average values of the recognition results and the confidences of sensors that have similar operating times and are of the same model as or a model similar to the sensor of the subject vehicle among the sensors of the other vehicles, for example. The result of the comparison is output to the degradation determination unit 224.

Through degradation diagnosis using such a comparison result, it becomes possible to perform comparison in accordance with unique characteristics of the model of the sensor, and realize more accurate degradation diagnosis.

To enable selection of recognition results and confidences of sensors that have similar operating times and are of the same model as or a model similar to the sensor of the subject vehicle, the recognition result acquisition unit 221 associates information (the vehicle ID) for identifying the vehicle 91 that is the subject vehicle, the location information (the measurement site, the measurement site ID, or the like) about the vehicle 91 and the time information (date and time), and information about the model (the sensor name) and the operating time (the start date of use, the use time, or the like) of the sensor with one another, when storing recognition results and confidences into the storage unit 361.

With this arrangement, a degradation diagnosis process can be performed on the basis of results of comparison with sensors that are the same as or similar to the sensors used in the other vehicles 91 and have similar operating times, or sensors having similar aging degradation.

As a result, a degradation diagnosis process can be performed, with the characteristics and aging degradation of each model of the sensors being taken into consideration.

Degradation Diagnosis Process According to the Second Embodiment

Figure 21:
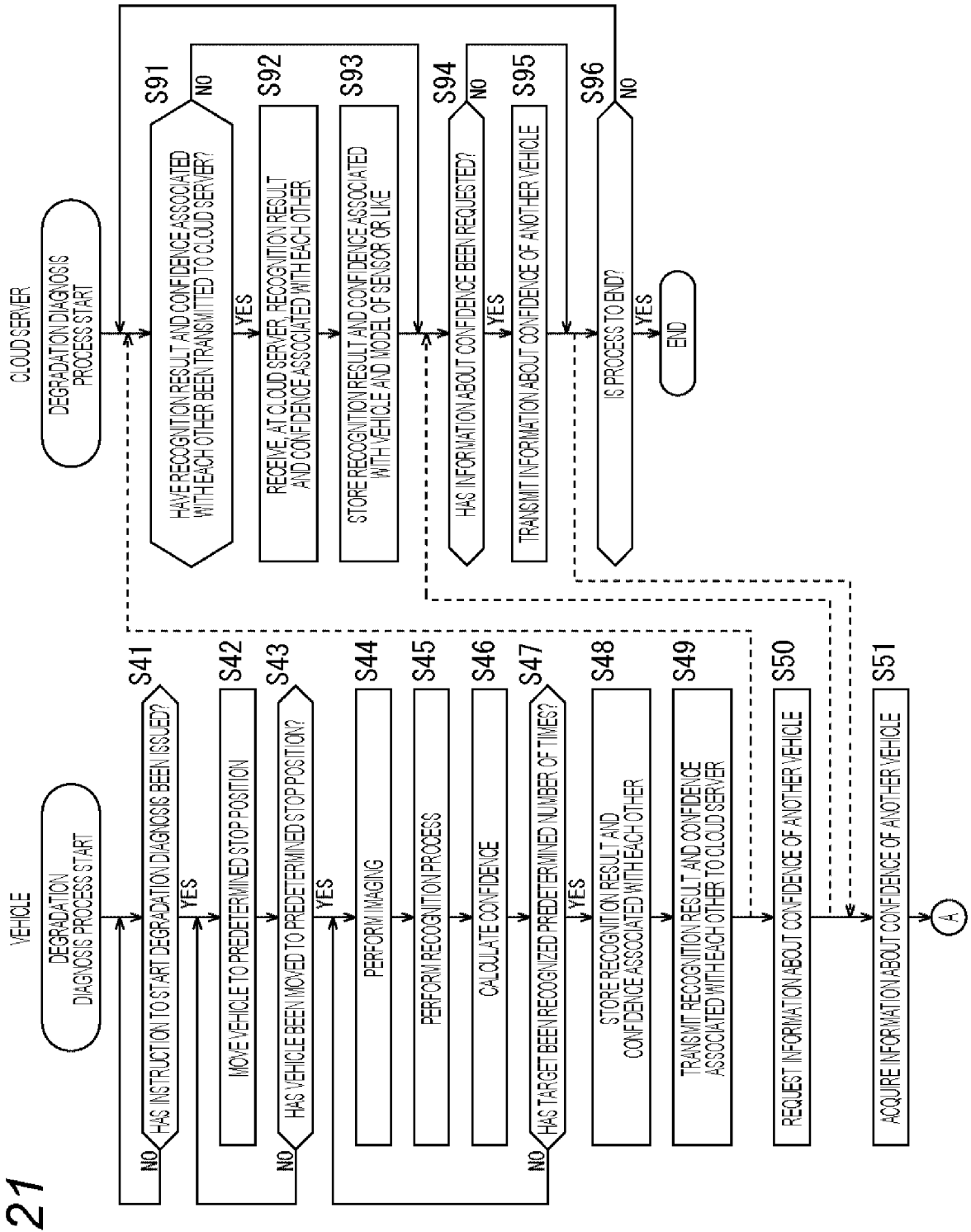
FIG. 21 is a flowchart for explaining a degradation diagnosis process according to the second embodiment.
Figure 22:
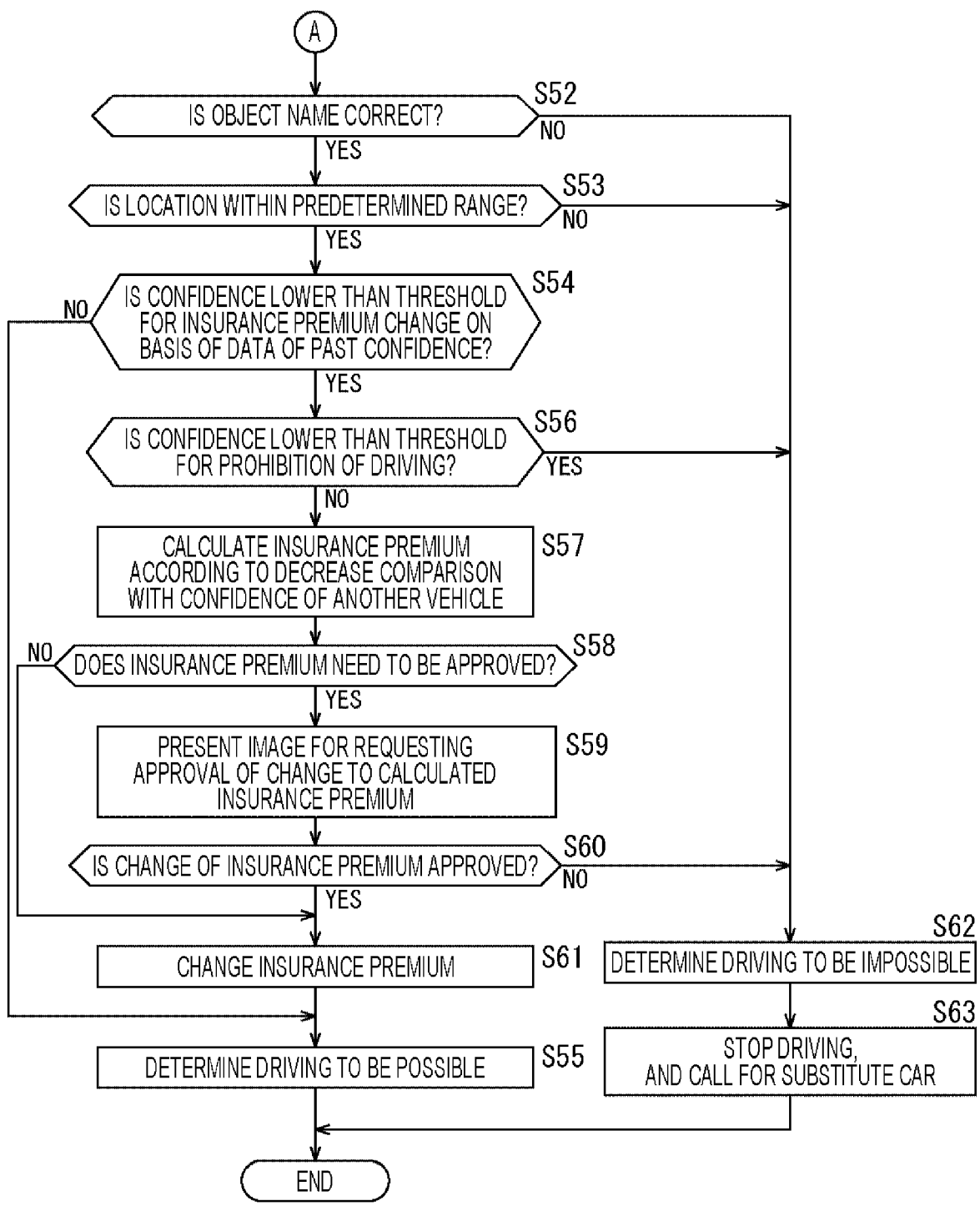
FIG. 22 is a flowchart for explaining the degradation diagnosis process according to the second embodiment.

Next, a degradation diagnosis process according to the second embodiment is described with reference to flowcharts in FIGS. 21 and 22. Note that the processes in steps S41 through S48 in FIG. 21 are the same as the processes in steps S11 through S18 in FIG. 12, and therefore, explanation of them is not repeated herein.

Specifically, in step S48, the recognition result acquisition unit 221 associates a recognition result including the location and the object name of the recognition target 61 and confidence information with the location information about the subject vehicle supplied from the location information acquisition unit 245 and the time information, and stores these associated pieces of information into the storage unit 111. The process then moves on to step S49.

In step S49, the recognition result acquisition unit 221 transmits the recognition result including the location and the object name of the recognition target 61 and the confidence information to the cloud server 351. At this point of time, the recognition result acquisition unit 221 averages the confidence information, and then transmits the information to the cloud server 351.

Here, the recognition result acquisition unit 221 associates the recognition result and the confidence information with the information (the vehicle ID) for identifying the vehicle 91 that is the subject vehicle, the location information (the measurement site, the measurement site ID, or the like) supplied from the location information acquisition unit 245 and the time information (date and time), and the information about the model (the sensor name) of the sensor and the operating time (the start date of use, the use time, or the like) of the sensor. The associated pieces of information are then transmitted to the cloud server 351.

In step S91, (the control unit (not shown) of) the cloud server 351 determines whether or not the recognition result and the confidence information have been transmitted from the vehicle 91.

If it is determined in step S91 that the recognition result and the confidence information have been transmitted, the process moves on to step S92.

In step S92, the cloud server 351 receives the transmitted recognition result and confidence information.

In step S93, the cloud server 351 stores the received recognition result and confidence information into the storage unit 361.

In doing so, the cloud server 351 associates the received recognition result and confidence information with the information (the vehicle ID) for identifying the vehicle 91, the location information (the measurement site, the measurement site ID, or the like) about the vehicle 91, the time information (date and time), the model (the sensor name) of the sensor, and the operating time (the start date of use, the use time, or the like) of the sensor. These associated pieces of information are then stored.

Through this series of processes, the recognition results and the confidence information supplied from the vehicles 91-1 to 91-*n* are associated with the information (the vehicle IDs) for identifying the vehicles 91, the location information (the measurement sites, the measurement site IDs, or the like) about the vehicles 91, the time information (dates and times), the models (the sensor names) of the sensors, and the operating times (the start dates of use, the use times, or the like) of the sensors. These associated pieces of information are then stored into the storage unit 361.

Note that, if it is determined in step S91 that any recognition result and confidence information have not been transmitted, the processes in steps S92 and S93 are skipped.

Here, the explanation returns to the process to be performed by the degradation diagnosis unit 182 of the vehicle 91.

After information obtained by averaging recognition results and confidences a predetermined number of times is stored into the storage unit 111 and the storage unit 361 of the cloud server 351 through the processes in steps S44 to S49, the process moves on to step S50.

In step S50, the comparison unit 223 controls the communication unit 103, to request the accumulated recognition results and confidences of sensors from the cloud server 351 in the network.

In doing so, the comparison unit 223 transmits the information (the vehicle ID) for identifying the subject vehicle 91, the location information (the measurement site, the measurement site ID, or the like) about the vehicle 91, the time information (date and time), the model (the sensor name) of the sensor, and information about the operating time (the start date of use, the use time, or the like) of the sensor, and requests the recognition results and the confidences of sensors that have similar operating times and are of the same model as or a model similar to the subject vehicle among the recognition results and the confidences stored in the storage unit 361 in the cloud server 351.

In step S94, (the control unit (not shown) of) the cloud server 351 determines whether or not a request for accumulated recognition results and confidences has been issued from any of the vehicles 91.

If it is determined in step S94 that there is a request for the accumulated recognition results and confidences, the process moves on to step S95.

In step S95, the cloud server 351 searches for and extracts the accumulated recognition results and confidences of the sensors that have similar operating times and are of the same model as or a model similar to the sensor of the vehicle 91 that has issued the request, among the recognition results and confidences stored in the storage unit 361. The extracted recognition results and confidences are then transmitted to the vehicle 91 that has issued the request.

Note that, if it is determined in step S94 that any request for the accumulated recognition results and confidences has not been issued, the process in step S95 is skipped.

In step S96, the cloud server 351 determines whether or not an instruction to end the process has been issued. If the end instruction has not been issued, the process returns to step S91, and the processes that follow are repeated.

In step S96, the process then comes to an end.

Meanwhile, in the vehicle 91, the comparison unit 223 in step S51 controls the communication unit 103, to receive the accumulated recognition result and confidence of a sensor that has a similar operating time and is of the same model as or a model similar to the sensor of the subject vehicle, as the accumulated recognition result and confidence being transmitted from the cloud server 351.

In step S52 (FIG. 22), the comparison unit 223 compares the object name based on the current recognition result stored in the storage unit 111 with the correct object name, and supplies the comparison result to the degradation determination unit 224. On the basis of the comparison result, the degradation determination unit 224 determines whether or not the object name in the object recognition result is correct, or is an object name similar to the correct object name. Note that the object name similar to the correct object name may be the object name in the recognition result of the sensor that has a similar operating time and is the same as or similar to the subject sensor, the recognition result having been acquired in the process in step S51.

If it is determined in step S52 that the object name in the object recognition result is correct or is an object name similar to the correct object name, the process moves on to step S53.

In step S53, the comparison unit 223 compares the location based on the current recognition result with the correct location, and supplies the comparison result to the degradation determination unit 224. On the basis of the comparison result, the degradation determination unit 224 determines whether or not the location as a recognition result is within the allowable range with respect to the correct location.

Here, whether or not a location recognition result is within the allowable range with respect to the correct location may be whether or not sufficiently accurate recognition has been performed as a result of comparison with a sensor of another vehicle in terms of the average value or the like of distances from the correct location, on the basis of the recognition result of the location of a sensor that has a similar operating time and is the same as or similar to the subject vehicle, for example, the recognition result having been acquired in the process in step S51.

If it is determined in step S53 that the location as a recognition result is within the allowable range with respect to the correct position, the process moves on to step S54.

In step S54, the comparison unit 223 compares the current confidence based on the result of sensing performed by the sensor of the subject vehicle with a threshold (the average value, for example) obtained from the confidence of another vehicle acquired in the process in step S51, and outputs the comparison result to the degradation determination unit 224. On the basis of the comparison result, the degradation determination unit 224 determines whether or not the degradation determined from the current confidence is lower than a threshold at which a change needs to be made to the insurance premium.

The determination here may be made through at least one detecting operation based on the confidences of the other vehicles, such as the outlier detection, the change point detection, or the abnormal portion detection described with reference to FIGS. 8 to 12, or through a combination thereof, for example.

If it is determined in step S54 that the degradation determined from the calculated current confidence is not lower than the threshold at which a change needs to be made to the insurance premium, the process moves on to step S55.

In step S55, the degradation determination unit 224 determines that there is no influence of degradation, determines that traveling by self-driving is possible, and notifies the situation recognition unit 153 of the determination. Thus, the self-driving by the vehicle 91 is continued.

If it is determined in step S54 that the degradation determined from the current confidence is lower than the threshold at which a change needs to be made to the insurance premium, on the other hand, the process moves on to step S56.

In step S56, on the basis of the comparison result, the degradation determination unit 224 determines whether or not the degradation determined from the current confidence is lower than a threshold at which traveling is regarded as impossible.

If it is determined in step S56 that the degradation determined from the current confidence is not lower than the threshold at which traveling is regarded as impossible on the basis of the comparison result, the process moves on to step S57.

In step S57, the degradation determination unit 224 causes the insurance premium determination unit 225 to calculate the insurance premium in accordance with the current degree of degradation.

In step S58, the degradation determination unit 224 determines whether or not the insurance premium calculated by the insurance premium determination unit 225 in accordance with the degradation is higher than a predetermined amount that requires approval of update from the user or the owner.

If it is determined in step S58 that the insurance premium calculated by the insurance premium determination unit 225 in accordance with the degradation is higher than the predetermined amount that requires approval of update from the user or the owner, the process moves on to step S59.

In step S59, on the basis of information about the insurance premium calculated by the insurance premium determination unit 225 in accordance with the degradation, the degradation determination unit 224 controls the UI display control unit 226 to display an image for requesting the user or the owner of the vehicle 91 to approve update of the insurance premium, as described above with reference to FIGS. 14 to 18.

In step S60, the degradation determination unit 224 determines whether or not the update of the insurance premium is approved, in accordance with the display of an image for requesting approval of the update of the insurance premium as described above with reference to FIGS. 14 to 18.

If it is determined in step S60 that the update of the insurance premium is approved by operating the button B51 in FIGS. 14 to 16 or the button B71 in FIGS. 17 and 18, the process moves on to step S61.

In step S61, the degradation determination unit 224 controls the communication unit 103, to access the insurance company's server that is not shown in the drawings, and update the contract with the approved insurance premium. The process then moves on to step S55.

That is, in this case, to cope with the risk corresponding to the level of degradation while recognizing the occurrence of degradation through comparison between the information about the recognition result and confidence of the same or a similar sensor that is of another vehicle and has a similar operating time and the recognition result and confidence of the subject vehicle, the insurance premium is recalculated.

When the recalculated insurance premium is higher than a predetermined amount that requires approval of update of the insurance premium from the user or the owner, and approval of the update is requested, the insurance contract is updated with the approved insurance premium, and the self-driving is continued.

On the other hand, if it is determined in step S52 that the object name in the object recognition result is neither the correct object name nor an object name similar to the correct object name, if it is determined in step S56 that the determined degradation is lower than the threshold at which traveling is regarded as impossible, or if it is determined in step S60 that the update of the insurance premium is disapproved by operating the button B52 in FIGS. 14 to 16 or the button B72 in FIGS. 17 and 18, the process moves on to step S62.

In step S62, the degradation determination unit 224 determines that traveling by self-driving is impossible due to the influence of the degradation, and notifies the situation recognition unit 153 of the determination. Thus, the self-driving by the vehicle 91 is suspended.

In step S63, the degradation determination unit 224 controls the communication unit 103, to call for a substitute vehicle capable of self-driving, in place of the vehicle 91, as necessary.

Further, if it is determined in step S58 that the insurance premium calculated by the insurance premium determination unit 225 in accordance with the degradation is not higher than the predetermined amount that requires approval of update from the user or the owner, the processes in steps S59 and S60 are skipped.

That is, with the insurance premium that is recalculated to cope with the risk corresponding to the level of degradation while recognizing the occurrence of degradation through comparison between the information about the recognition result and confidence of the same or a similar sensor that is of another vehicle and has a similar operating time and the recognition result and confidence of the subject vehicle, the insurance contract is automatically updated without any request for approval from the user or the owner, and the self-driving is continued.

The self-driving is continued in a case where the results of the above series of processes show that the object name in the object recognition result is correct, the location recognition result is within the predetermined range, and the degradation of the confidence is not so high as to change the insurance premium, on the basis of information about the recognition result and confidence of a sensor of another vehicle that has a similar operating time and is of the same model as or a model similar to the sensor of the subject vehicle.

Also, in a case where the object name in the object recognition result is correct, the location recognition result is within the predetermined range, the degradation of the confidence requires a change in the insurance premium, and self-driving is not impossible, the insurance premium corresponding to the degradation is recalculated. When the recalculated insurance premium is lower than a predetermined amount, the insurance contract is automatically updated with the recalculated insurance premium, and the self-driving is continued. When the recalculated insurance premium is higher than the predetermined amount, approval of the contract update with the recalculated insurance premium is requested. When the update is approved in response to the request, the contract is updated with the recalculated insurance premium, and the self-driving is continued.

Further, in a case where the object name in the object recognition result is not correct, the location recognition result is not within the predetermined range, or the degradation of the confidence is at such a level as to require a change of the insurance premium, when the update of the insurance premium is not approved, and the degradation further worsens to disable self-driving, the self-driving is suspended.

Also, degradation diagnosis is conducted for a camera among the sensors in the example process described above. However, a degradation diagnosis process similar to the above can be performed on all the sensors included in the data acquisition unit 102.

When degradation of any of the sensors is detected through this process, it is possible to determine whether or not self-driving is possible, in accordance with the degree of degradation.

Also, with this arrangement, a degradation diagnosis process can be performed on the basis of results of comparison with sensors that are the same as or similar to the sensors used in the other vehicles 91 and have similar operating times, or sensors having similar aging degradation.

As a result, through a degradation diagnosis process taking into account the characteristics and aging degradation of each model of sensors, it is possible to determine whether or not self-driving is possible with high accuracy before a sensor breaks down completely. Thus, the risk of occurrence of an accident due to a breakdown can be lowered.

5. Example Applications

In the above description, the degradation diagnosis system 31 that performs a degradation diagnosis process on the vehicle 91 at the testing site 51 located at the entrance or the like of various areas such as a residential area that requires high safety standards has been explained. However, the degradation diagnosis system 31 may be designed to perform a degradation diagnosis process at a time when a vehicle stops at a traffic light, for example, at a specific outdoor location.

Figure 23:
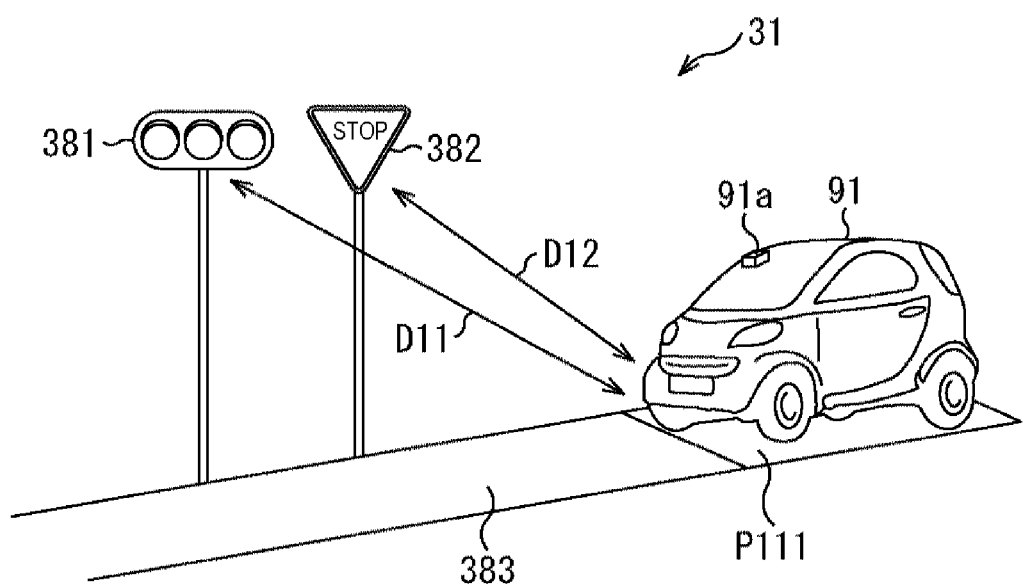
FIG. 23 is a diagram for explaining example applications of a degradation diagnosis system of the present disclosure.

Specifically, as indicated by a degradation diagnosis system 31 in FIG. 23, for example, in a case where a vehicle 91 traveling on a road 383 stops at a stop position P111 at a predetermined distance D11 from a traffic light 381 because the red light of the traffic light 381 is on, a degradation diagnosis process may be performed with a recognition target that is a road sign 382 or the like existing at a predetermined distance D12 from the stop position P111.

With this arrangement, a configuration like the testing site 51 is not required, and accordingly, a degradation diagnosis process can be readily performed.

Note that, in the degradation diagnosis system 31 in FIG. 23, a degradation diagnosis process is performed outdoors without the testing site 51. Therefore, it is necessary to evaluate object recognition results, taking into consideration the influence of outdoor environments such as brightness and wink depending on weather, time, and the like.

For example, a degradation diagnosis process is performed with the use of the recognition result and the confidence of another vehicle having the same environmental conditions, so that a degradation diagnosis process taking into consideration the influence of environments can be performed.

6. Examples in which Processes are Carried Out by Software

Meanwhile, the above described series of processes can be performed by hardware, but can also be performed by software. In a case where the series of processes are performed by software, the program that forms the software can be installed in a computer incorporated into special-purpose hardware, or can be installed from a recording medium into a general-purpose computer or the like that can execute various kinds of functions by installing various kinds of programs, for example.

Figure 24:
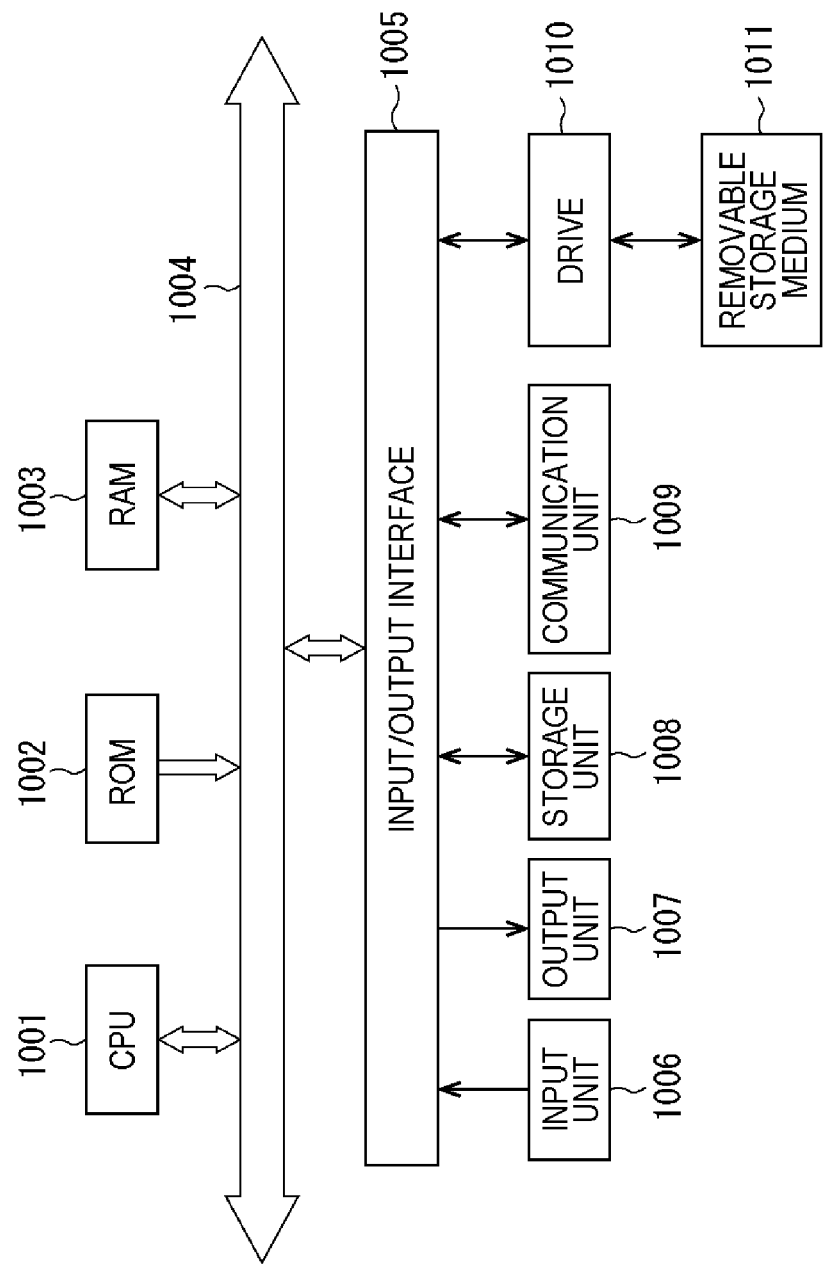
FIG. 24 is a diagram for explaining an example configuration of a general-purpose computer.

FIG. 24 shows an example configuration of a general-purpose computer. This personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

An input unit 1006, an output unit 1007, a storage unit 1008, and a communication unit 1009 are connected to the input/output interface 1005. The input unit 1006 is formed with an input device such as a keyboard or a mouse through which a user inputs an operation command, the output unit 1007 outputs an image of a process operating screen or a processing result to a display device, the storage unit 1008 is formed with a hard disk drive or the like that stores programs and various kinds of data, and the communication unit 1009 is formed with a local area network (LAN) adapter or the like and performs a communication process via a network that is typically the Internet. A drive 1010 is also connected to the input/output interface 1005. The drive 1010 performs data reading and writing on a removable storage medium 1011, such as a magnetic disk (such as a flexible disk), an optical disk (such as a Compact Disc-Read-Only Memory (CD-ROM) or a Digital Versatile Disc (DVD)), a magnetooptical disk (such as Mini Disc (MD)), or a semiconductor memory.

The CPU 1001 performs various processes in accordance with a program that is stored in the ROM 1002, or a program that is read from the removable storage medium 1011, which is a magnetic disk, an optical disk, a magnetooptical disk, a semiconductor memory, or the like, is installed into the storage unit 1008, and is loaded from the storage unit 1008 into the RAM 1003. The RAM 1003 also stores data and the like necessary for the CPU 1001 to perform various processes, as appropriate.

In the computer having the above described configuration, for example, the CPU 1001 loads a program stored in the storage unit 1008 into the RAM 1003 via the input/output interface 1005 and the bus 1004, and executes the program, so that the above described series of processes are performed.

The program to be executed by the computer (the CPU 1001) may be recorded on the removable storage medium 1011 as a packaged medium or the like, for example, and be then provided. Alternatively, the program can be provided via a wired or wireless transmission medium, such as a local area network, the Internet, or digital satellite broadcasting.

In the computer, the program can be installed into the storage unit 1008 via the input/output interface 1005 when the removable storage medium 1011 is mounted on the drive 1010. Also, the program can be received by the communication unit 1009 via a wired or wireless transmission medium, and be installed into the storage unit 1008. Alternatively, the program can be installed beforehand into the ROM 1002 or the storage unit 1008.

Note that the program to be executed by the computer may be a program for performing processes in chronological order in accordance with the sequence described in this specification, or may be a program for performing processes in parallel or performing a process when necessary, such as when there is a call.

Note that the CPU 1001 in FIG. 24 achieves the functions of the degradation diagnosis unit 182 shown in FIGS. 5, 19, and 20.

Also, in this specification, a system means an assembly of plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Note that embodiments of the present disclosure are not limited to the above described embodiments, and various modifications can be made to the embodiments without departing from the scope of the present disclosure.

For example, the present disclosure can be embodied in a cloud computing configuration in which one function is shared among devices via a network, and processing is performed by the plurality of devices cooperating with one another.

Further, the respective steps described with reference to the flowcharts described above can be carried out by one device or can be shared among a plurality of devices.

Furthermore, in a case where a plurality of processes is included in one step, the plurality of processes included in the one step can be performed by one device or can be shared among a plurality of devices.

Also, the embodiments described above are designed to perform sensor degradation diagnosis processes. However, it is also possible to evaluate the safety performance of a sensor by a similar method.

Note that the present disclosure can also be embodied in the configurations described below.

<1> An information processing system including:
a recognition result acquisition unit that acquires a recognition result of a predetermined recognition target, on the basis of results of sensing performed by a plurality of sensors mounted in a vehicle;
a comparison unit that compares the acquired recognition result with another recognition result different from the acquired recognition result, and outputs a comparison result; and
a degradation evaluation unit that evaluates performance degradation of each of the sensors, on the basis of the comparison result output from the comparison unit.

<2> The information processing system according to <1>, in which
the another recognition result is a past recognition result of the subject vehicle.

<3> The information processing system according to <2>, further including
a storage unit that accumulates the recognition result acquired by the recognition result acquisition unit,
in which
the comparison unit compares the recognition result accumulated in the storage unit with the recognition result acquired as the another recognition result.

<4> The information processing system according to <1>, in which
the comparison unit calculates outliers on the basis of the acquired recognition result and the another recognition result, and compares the number of the outliers with a predetermined threshold, and
the degradation evaluation unit evaluates performance degradation of each of the sensors, on the basis of a comparison result between the outlier of each of the sensors and the predetermined threshold.

<5> The information processing system according to <1>, in which
the comparison unit detects a change point on the basis of the acquired recognition result and the another recognition result, and compares a change at the change point with a predetermined threshold, and
the degradation evaluation unit evaluates performance degradation of each of the sensors, on the basis of a comparison result between the change at the change point of each of the sensors and the predetermined threshold obtained by the comparison unit.

<6> The information processing system according to <1>, in which
the another recognition result is a recognition result of another vehicle different from the subject vehicle.

<7> The information processing system according to <6>, in which
the another recognition result is a recognition result based on a result of sensing performed by a sensor of the another vehicle, the sensor of the another vehicle being the same as or similar to a sensor of the subject vehicle.

<8> The information processing system according to <6>, in which
the another recognition result is a recognition result based on a result of sensing performed by a sensor of the another vehicle, the sensor of the another vehicle having the same operating time as or an operating time similar to an operating time of a sensor of the subject vehicle.

<9> The information processing system according to <6>, further including
a storage unit that accumulates a recognition result acquired by the recognition result acquisition unit,
in which
the storage unit is provided in a cloud server, and
the comparison unit compares the recognition result accumulated in the storage unit of the cloud server with the recognition result acquired as the another recognition result.

<10> The information processing system according to <1>, further including
a situation recognition unit that suspends self-driving of the vehicle, when the degradation evaluation unit evaluates that performance of the sensor is lower than a predetermined threshold.

<11> The information processing system according to <10>, further including
an insurance premium determination unit that determines an insurance premium in accordance with degradation, when the degradation evaluation unit evaluates that performance of the sensor is lower than a predetermined threshold,
in which,
when update of an insurance contract with the insurance premium corresponding to the degradation is approved, the situation recognition unit allows the vehicle to continue self-driving.

<12> The information processing system according to <11>, in which,
when the degradation evaluation unit evaluates that performance of the sensor is lower than the predetermined threshold, the insurance premium determination unit determines an insurance premium in accordance with degradation, notifies the user or the owner of the vehicle of information for requesting approval of update of an insurance contract with the insurance premium corresponding to the degradation, and,
when the update of the insurance contract with the insurance premium corresponding to the degradation is approved in response to the notification, the situation recognition unit allows the vehicle to continue the self-driving.

<13> The information processing system according to <11>, in which,
when the degradation evaluation unit evaluates that performance of the sensor is lower than the predetermined threshold, the insurance premium determination unit determines an insurance premium in accordance with degradation, and,
when update of the insurance contract with the insurance premium corresponding to the degradation is not approved, the situation recognition unit suspends the self-driving of the vehicle.

<14> The information processing system according to <1>, in which
the comparison unit and the degradation evaluation unit are provided in a cloud server.

<15> The information processing system according to <1>, in which
the recognition result acquisition unit acquires a recognition result of the predetermined recognition target, on the basis of results of sensing performed by the plurality of sensors mounted in the vehicle in a space in which a positional relationship between the vehicle and the predetermined recognition target is a known relationship.

<16> The information processing system according to <14>, in which
the space in which the positional relationship between the vehicle and the predetermined recognition target is a known relationship is a space that is not affected by an environment.

<17> The information processing system according to <16>, in which
the space in which the positional relationship between the vehicle and the predetermined recognition target is a known relationship is a space that is affected by the environment, and
the degradation evaluation unit evaluates performance degradation of each of the sensors, on the basis of a result of comparison performed by the comparison unit on each of the sensors, with influence of the environment being taken into consideration.

<18> The information processing system according to <16>, in which
the comparison unit compares a confidence based on the recognition result with a confidence based on the another recognition result, and
the degradation evaluation unit evaluates performance degradation of the sensor, on the basis of a result of comparison between the confidence of the recognition result and the confidence of the another recognition result.

<19> The information processing system according to <17>, in which
the recognition target further has a known object name,
the recognition result includes a detected position and an object name of the recognition target, and
the information processing system further includes a confidence calculation unit that calculates a confidence of the recognition result, on the basis of the recognition result.

<20> An information processing method including the steps of:
  acquiring a recognition result of a predetermined recognition target, on the basis of results of sensing performed by a plurality of sensors mounted in a vehicle;
  comparing the acquired recognition result with another recognition result different from the acquired recognition result, and outputting a comparison result; and
  evaluating performance degradation of each of the sensors, on the basis of the comparison result.

<21> An information processing apparatus including:
  a recognition result acquisition unit that acquires a recognition result of a predetermined recognition target, on the basis of results of sensing performed by a plurality of sensors mounted in a vehicle;
  a comparison unit that compares the acquired recognition result with another recognition result different from the acquired recognition result, and outputs a comparison result; and
  a degradation evaluation unit that evaluates performance degradation of each of the sensors, on the basis of the comparison result output from the comparison unit.

REFERENCE SIGNS LIST

31 Degradation diagnosis system
51 Testing site
61 Recognition target
91, 91-1 to 91-n Vehicle
91a Camera
91b LiDAR
91c Millimeter-wave radar
103 Communication unit
111 Storage unit
143 Vehicle state detection unit
181 Degradation diagnosis unit
220 Recognition unit
221 Recognition result acquisition unit
222 Confidence calculation unit
223 Comparison unit
224 Degradation determination unit
225 Insurance premium determination unit
226 UI display control unit
241 Camera recognition unit
242 LiDAR recognition unit
243 Millimeter-wave radar recognition unit
244 Other-sensor recognition unit
225 Location information acquisition unit
301 Cloud server
311 Storage unit
312 Insurance premium determination unit
351 Cloud server
361 Storage unit
223 Third feature amount calculation unit
271 Second feature amount calculation unit
272 Third feature amount calculation unit

The invention claimed is:
1. An information processing system, comprising:
  a processor configured to:
    acquire a plurality of first recognition results of a recognition target, based on sensing operations by a plurality of sensors in a first vehicle,
      wherein each of the plurality of first recognition results includes at least one of a position or an object name of the recognition target;
    calculate a confidence value of each of the plurality of first recognition results based on the at least one of the position or the object name of the recognition target;
    acquire a confidence value of a second recognition result, wherein the second recognition result is different from the plurality of first recognition results;
    compare the calculated confidence value of a specific recognition result of the plurality of first recognition results with the acquired confidence value of the second recognition result, to output a comparison result;
    detect a change point of the confidence value of the specific recognition result based on the comparison result that is larger than a first threshold, wherein
      the change point corresponds to a point of fluctuation of the calculated confidence value of the specific recognition result;
    compare a change of the calculated confidence value of the specific recognition result at the change point with a second threshold;
    evaluate performance degradation of each sensor of the plurality of sensors, based on the comparison between the change of the calculated confidence value at the change point and the second threshold; and
    control a self-driving operation of the first vehicle based on the evaluated performance degradation of each sensor of the plurality of sensors.

2. The information processing system according to claim 1, wherein the second recognition result is a past recognition result of the first vehicle.

3. The information processing system according to claim 2, further comprising a memory configured to accumulate the acquired confidence value of the second recognition result,
  wherein the processor is further configured to compare the confidence value of each of the plurality of first recognition results with the accumulated confidence value of the second recognition result.

4. The information processing system according to claim 1, wherein the second recognition result is a recognition result of a second vehicle different from the first vehicle.

5. The information processing system according to claim 4, wherein
  the second recognition result is based on a result of a sensing operation by a sensor of the second vehicle, and
  the sensor of the second vehicle is same as a sensor of the plurality of sensors in the first vehicle.

6. The information processing system according to claim 4, wherein
  the second recognition result is based on a result of a sensing operation by a sensor of the second vehicle, and
  an operating time of the sensor of the second vehicle and an operating time of a sensor of the plurality of sensors in the first vehicle are same.

7. The information processing system according to claim 4, further comprising a cloud server and a memory in the cloud server, wherein
  the memory is configured to accumulate the acquired confidence value of the second recognition result, and
  the processor is further configured to compare the calculated confidence value of each of the plurality of first recognition results with the accumulated confidence value of the second recognition result.

8. The information processing system according to claim 1, wherein the processor is further configured to suspend the self-driving operation of the first vehicle based on the evaluated performance degradation of a sensor of the plurality of sensors is lower than a third threshold.

9. The information processing system according to claim 8, wherein the processor is further configured to determine an insurance premium associated with the first vehicle based on the evaluated performance degradation of the sensor is lower than the third threshold.

10. The information processing system according to claim 9, wherein the processor is further configured to:
notify, based on the evaluated performance degradation of the sensor is lower than the third threshold, a user or an owner of the first vehicle of information to request an approval of an update of an insurance contract with the insurance premium; and
control, based on the approval of the update of the insurance contract with the insurance premium, the first vehicle to continue the self-driving operation.

11. The information processing system according to claim 9, wherein the processor is further configured to:
notify, based on the evaluated performance degradation of the sensor is lower than the third threshold, a user or an owner of the first vehicle of information to request an approval of an update of an insurance contract with the insurance premium; and
suspend, based on the update of the insurance contract with the insurance premium is not approved, the self-driving operation of the first vehicle.

12. The information processing system according to claim 1, further comprising a cloud server, wherein the processor is in the cloud server.

13. The information processing system according to claim 1, wherein
the plurality of sensors performs the sensing operations in a state in which the first vehicle is in a space, and
in the space, the first vehicle is at a specific distance from the recognition target.

14. The information processing system according to claim 13, wherein
the space is not affected by a plurality of environmental factors,
the plurality of environmental factors include wind and light, and
the space corresponds to an indoor space.

15. The information processing system according to claim 13, wherein
the space is affected by a plurality of environmental factors,
the plurality of environmental factors includes wind and light, and
the processor is further configured to evaluate the performance degradation of each sensor of the plurality of sensors based on the plurality of environmental factors.

16. An information processing method, comprising:
acquiring a plurality of first recognition results of a recognition target, based on sensing operations by a plurality of sensors in a vehicle, wherein
each of the plurality of first recognition results includes at least one of a position or an object name of the recognition target;
calculating a confidence value of each of the plurality of first recognition results based on the at least one of the position or the object name of the recognition target;
acquiring a confidence value of a second recognition result, wherein the second recognition result is different from the plurality of first recognition results;
comparing the calculated confidence value of a specific recognition result of the plurality of first recognition results with the acquired confidence value of the second recognition result, for outputting a comparison result;
detecting a change point of the confidence value of the specific recognition result based on the comparison result that is larger than a first threshold, wherein
the change point corresponds to a point of fluctuation of the calculated confidence value of the specific recognition result;
comparing a change of the calculated confidence value of the specific recognition result at the change point with a second threshold;
evaluating performance degradation of each sensor of the plurality of sensors, based on the comparison between the change of the calculated confidence value at the change point and the second threshold; and
controlling a self-driving operation of the vehicle based on the evaluated performance degradation of each sensor of the plurality of sensors.

17. An information processing apparatus, comprising:
a processor configured to:
acquire a plurality of first recognition results of a recognition target, based on sensing operations by a plurality of sensors in a vehicle, wherein
each of the plurality of first recognition results includes at least one of a position or an object name of the recognition target;
calculate a confidence value of each of the plurality of first recognition results based on the at least one of the position or the object name of the recognition target;
acquire a confidence value of a second recognition result, wherein the second recognition result is different from the plurality of first recognition results;
compare the calculated confidence value of a specific recognition result of the plurality of first recognition results with the acquired confidence value of the second recognition result, to output a comparison result;
detect a change point of the confidence value of the specific recognition result based on the comparison result that is larger than a first threshold, wherein
the change point corresponds to a point of fluctuation of the calculated confidence value of the specific recognition result;
compare a change of the calculated confidence value of the specific recognition result at the change point with a second threshold;
evaluate performance degradation of each sensor of the plurality of sensors, based on the comparison between the change of the calculated confidence value at the change point and the second threshold; and
control a self-driving operation of the vehicle based on the evaluated performance degradation of each sensor of the plurality of sensors.

* * * * *